(12) United States Patent
Wang

(10) Patent No.: US 10,669,024 B2
(45) Date of Patent: Jun. 2, 2020

(54) UNMANNED AERIAL VEHICLE, CONTROL SYSTEM AND METHOD THEREOF, AND UNMANNED AERIAL VEHICLE LANDING CONTROL METHOD

(71) Applicant: SZ DJI TECHNOLOGY CO., LTD., Shenzhen (CN)

(72) Inventor: Mingyu Wang, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 29 days.

(21) Appl. No.: 15/860,113

(22) Filed: Jan. 2, 2018

(65) Prior Publication Data
US 2018/0208309 A1    Jul. 26, 2018

Related U.S. Application Data

(63) Continuation of application No. PCT/CN2015/083171, filed on Jul. 2, 2015.

(51) Int. Cl.
| | |
|---|---|
| *B64C 39/02* | (2006.01) |
| *B64C 25/56* | (2006.01) |
| *G05D 1/06* | (2006.01) |
| *G05D 1/10* | (2006.01) |

(52) U.S. Cl.
CPC ............ *B64C 39/024* (2013.01); *B64C 25/56* (2013.01); *G05D 1/0676* (2013.01); *B64C 2201/024* (2013.01); *B64C 2201/18* (2013.01)

(58) Field of Classification Search
CPC ....... B64C 39/02; B64C 25/00; B64C 35/008; G05D 1/10; G05D 1/0676
USPC .......................................................... 701/16
See application file for complete search history.

(56) References Cited

U.S. PATENT DOCUMENTS

| | | | |
|---|---|---|---|
| 5,692,706 A | 12/1997 | Arney et al. | |
| 7,150,662 B1 | 12/2006 | Janitz | |
| 2002/0047071 A1* | 4/2002 | Illingworth ........... | B64C 11/001 244/199.1 |
| 2003/0011493 A1 | 1/2003 | Wiplinger | |
| 2003/0164424 A1* | 9/2003 | Smith ..................... | B64C 25/12 244/105 |
| 2008/0071431 A1 | 3/2008 | Dockter et al. | |
| 2010/0066158 A1 | 3/2010 | Hamilton | |

(Continued)

FOREIGN PATENT DOCUMENTS

| | | |
|---|---|---|
| CN | 2220990 Y | 2/1996 |
| CN | 2411207 Y | 12/2000 |

(Continued)

OTHER PUBLICATIONS

The World Intellectual Property Organization (WIPO) International Search Report and Written Opinion for PCT/CN2015/083171 dated Mar. 24, 2016 11 Pages.

(Continued)

*Primary Examiner* — Tan Q Nguyen
(74) *Attorney, Agent, or Firm* — Anova Law Group, PLLC

(57) ABSTRACT

An unmanned aerial vehicle includes a fuselage, a power device connected to the fuselage, and a control device disposed at the fuselage and electrically connected with the power device. The control device is configured to control the power device to switch an operating mode of the power device to cause the unmanned aerial vehicle to fly in air or navigate on a water surface.

20 Claims, 16 Drawing Sheets

(56) References Cited

U.S. PATENT DOCUMENTS

| | | | |
|---|---|---|---|
| 2011/0042508 A1 | 2/2011 | Bevirt | |
| 2011/0248118 A1 | 10/2011 | Meekins et al. | |
| 2012/0248241 A1 | 10/2012 | Goelet | |
| 2013/0206915 A1 | 8/2013 | Desaulniers | |
| 2014/0319265 A1* | 10/2014 | Cacciaguerra | B64C 27/22 244/6 |
| 2016/0189550 A1* | 6/2016 | Chan | G08G 5/0043 701/3 |
| 2016/0376000 A1 | 12/2016 | Kohstall | |

FOREIGN PATENT DOCUMENTS

| | | |
|---|---|---|
| CN | 1876493 A | 12/2006 |
| CN | 200988577 Y | 12/2007 |
| CN | 101670889 A | 3/2010 |
| CN | 102198861 A | 9/2011 |
| CN | 102424110 A | 4/2012 |
| CN | 102815397 A | 12/2012 |
| CN | 102933460 A | 2/2013 |
| CN | 202783781 U | 3/2013 |
| CN | 124723 B | 12/2014 |
| CN | 104199462 A | 12/2014 |
| CN | 204279934 U | 4/2015 |
| CN | 104626904 A | 5/2015 |
| CN | 104724284 A | 6/2015 |
| CN | 204368424 U | 6/2015 |
| FR | 2937306 A1 | 4/2010 |
| JP | H11334698 A | 12/1999 |
| JP | 2008203123 A | 9/2008 |
| JP | 2009514740 A | 4/2009 |
| KR | 20160072445 A | 6/2016 |
| RU | 2179135 C1 | 2/2002 |
| RU | 2281228 C1 | 8/2006 |
| WO | 2014055269 A1 | 4/2014 |

OTHER PUBLICATIONS

Charlie Fang, Water and Amphibious Splash Drone Waterproof Quadcopter, igao7.com, dated May 30, 2015, p. 1, Fig. 1. (Machine translation included) http://www.igao7.cominews/201505/RV4g1Z8RMmlnyTmu.html.

* cited by examiner

UNMANNED AERIAL VEHICLE, CONTROL SYSTEM AND METHOD THEREOF, AND UNMANNED AERIAL VEHICLE LANDING CONTROL METHOD

CROSS-REFERENCE TO RELATED APPLICATION

This application is a continuation application of International Application No. PCT/CN2015/083171, filed on Jul. 2, 2015, the entire contents of which are incorporated herein by reference.

FIELD OF THE DISCLOSURE

The present disclosure relates to an unmanned aerial vehicle, an unmanned aerial vehicle control system, an unmanned aerial vehicle control method, and an unmanned aerial vehicle landing control method.

BACKGROUND

A pilotless aircraft is called "unmanned aerial vehicle", and is an unmanned aircraft manipulated by using a radio remote control apparatus and a self-contained program control device. Amphibian unmanned aerial vehicles are usually mainly used in aerial flight, and can perform a short navigation in the water when executing a task over water areas such as a sea surface. However, the existing unmanned aerial vehicles can only be used as flight toys. They can neither navigate on water, nor achieve an amphibian function either. Therefore, the pleasure from using the existing unmanned aerial vehicles is limited.

SUMMARY OF THE DISCLOSURE

In view of the above content, there is a need to provide an amphibian unmanned aerial vehicle that can fly in the air and navigate on water, and its control system and method and its landing control method.

An unmanned aerial vehicle, including a fuselage, a power device connected onto the fuselage, and a control device and a takeoff and landing device disposed on the fuselage, wherein the power device and the takeoff and landing device are electrically connected with the control device respectively. The control device includes a landing surface detection assembly, and the control device is used for, when the landing surface detection assembly detects that a landing destination of the unmanned aerial vehicle is a water surface, controlling operating modes of the power device and the takeoff and landing device. It enables the unmanned aerial vehicle to land on the water surface and navigate.

In addition, the unmanned aerial vehicle includes a control device. When the landing surface detection assembly detects that the landing destination of the unmanned aerial vehicle is the water surface, the control device is capable of controlling the takeoff and landing device to switch to a buoyancy support state, and controlling the power device to drive the entire unmanned aerial vehicle to land onto the landing destination.

Moreover, the landing surface detection assembly includes an image collector which is capable of acquiring a surface image of the landing destination of the unmanned aerial vehicle, and determining whether the landing destination is a water surface or not according to the surface image.

In some embodiments, the image collector includes a camera and an image analysis element. The camera is capable of acquiring the surface image of the landing destination and transmitting the surface image into the image analysis element. And, the image analysis element is capable of determining whether the landing destination is a water surface or not according to surface texture features of the landing destination.

In some embodiments, the image analysis element is pre-set therein with ripple features of a water surface. The image analysis element extracts surface texture features of the surface image from the surface image, compares the surface texture features with the ripple features of the water surface, and determines whether the landing destination is the water surface or not.

In some embodiments, the image collector includes a camera and an image processing element. The camera is capable of acquiring the surface image of the landing destination and transmitting the surface image into the image processing element. The image processing element determines whether the landing destination is a water surface or not according to imaging spectrum features of the landing destination.

In some embodiments, the image processing element is pre-set therein with simulated spectrum features of a water surface. The image processing element is capable of constructing and calculating surface reflectivity of the landing destination according to the surface image of the landing destination to acquire surface spectrum features of the landing destination, and comparing the surface spectrum features of the landing destination with the pre-set simulated spectrum features. Accordingly, it can determine whether the landing destination is the water surface or not.

In some embodiments, the image collector is an imaging spectrometer.

In some embodiments, the image collector includes a plurality of cameras and a plurality of polarizers each of which is disposed on one of the cameras.

In some embodiments, performance parameters of the plurality of cameras are identical while polarizing angles of the plurality of polarizers are different from each other.

In some embodiments, the landing surface detection assembly further includes a distance sensor which is capable of detecting a distance between the unmanned aerial vehicle and the landing destination. It will allow the control device to control the takeoff and landing device to enter into a ready-to-land state according to the distance.

In some embodiments, the distance sensor is at least one of a barometer, an ultrasonic range-finding sensor, a laser range-finding sensor, and/or a visual sensor.

In some embodiments, the distance sensor, when determining that the distance between the unmanned aerial vehicle and the landing destination is within a pre-set range, allows the control device to control the takeoff and landing device to enter into the ready-to-land state according to the distance.

In some embodiments, the landing surface detection assembly further includes a depth detector which is capable of detecting the depth of the water when the image collector determines that the landing destination is the water surface. The control device is capable of controlling the power device not to drive the entire unmanned aerial vehicle to land when the depth detector determines that the depth falls within a pre-set depth range.

In some embodiments, the depth detector is a water depth detecting instrument.

In some embodiments, the unmanned aerial vehicle further includes an alarm which is capable of sending a warning signal to a user of the unmanned aerial vehicle to indicate that the landing destination is not suitable for landing when the depth detector determines that the depth falls within a pre-set depth range.

In some embodiments, the alarm is a warning light, a buzzer, or an electronic information sender.

In some embodiments, the fuselage includes a vehicle body on which both the takeoff and landing device and the power device are disposed. The takeoff and landing device includes a suspension device which is capable of providing buoyancy support when the unmanned aerial vehicle lands on the water surface for navigation.

In some embodiments, the suspension device is an inflatable buoyancy plate.

In some embodiments, the suspension device is a buoyancy plate made of a solid buoyancy material.

In some embodiments, the suspension device includes a bottom plate and a side plate disposed on a peripheral edge of the bottom plate between which a predetermined angle is formed.

In some embodiments, the side plate is adjustably mounted on the bottom plate. The angle formed between the bottom plate and the side plate is adjustable.

Further, the bottom plate is adjustably connected onto the vehicle body An angle formed between the bottom plate and the vehicle body is adjustable.

In some embodiments, the suspension device is circularly disposed outside the vehicle body.

In some embodiments, the suspension device coats all or some structures of the vehicle body therein.

In some embodiments, the takeoff and landing device further includes a landing gear disposed on the vehicle body, and the suspension device disposed on the landing gear.

In some embodiments, the landing gear includes a supporting mechanism disposed on the vehicle body and a buffer mechanism disposed on the supporting mechanism.

In some embodiments, the buffer mechanism is a buffer member made of an elastic material.

In some embodiments, the buffer mechanism is at least one of a pneumatic damper, a hydraulic damper, and/or a spring damper.

In some embodiments, the supporting mechanism is a telescopic supporting mechanism. The supporting mechanism is capable of driving the buffer mechanism to relatively keep away from or get close to the vehicle body.

In some embodiments, the supporting mechanism is a cylinder. The buffer mechanism is disposed on a drive rod of the cylinder. The cylinder drives the buffer mechanism to relatively keep away from or get close to the vehicle body through the drive rod.

In some embodiments, the supporting mechanism is a voice coil motor. The buffer mechanism is disposed on a driving end of the voice coil motor. The voice coil motor drives the buffer mechanism to relatively keep away from or get close to the vehicle body through the driving end.

In some embodiments, the supporting mechanism is a linear motor. The buffer mechanism is disposed on a rotator of the linear motor. The linear motor drives the buffer mechanism to relatively keep away from or get close to the vehicle body through the rotator.

In some embodiments, the supporting mechanism includes a guide rail, an electromagnet, and a permanent magnet. The guide rail is connected onto the vehicle body. The buffer mechanism is slidably disposed on the guide rail. One of the electromagnet and the permanent magnet is disposed on the buffer mechanism. The other one of the electromagnet and the permanent magnet is disposed on the vehicle body. By controlling a direction of a current on the electromagnet, the electromagnet attracts or repels the permanent magnet, which causes the buffer mechanism to relatively keep away from or get close to the vehicle body along the guide rail.

In some embodiments, the supporting mechanism includes an electric motor, a lead screw, and a nut. The electric motor is connected onto the vehicle body. The lead screw is in a coaxial fixed connection with a driving shaft of the electric motor. The nut is sleeved on the lead screw and connected with the buffer mechanism. The electric motor drives the lead screw to rotate. The lead screw is combined with the nut by thread to drive the nut to move relative to the lead screw. And, the nut drives the buffer mechanism to move.

In some embodiments, the supporting mechanism includes an electric motor, a gear and a rack. The electric motor is connected onto the vehicle body while the gear is connected onto a driving shaft of the electric motor. The rack meshes with the gear. And, the buffer mechanism is mounted on the rack. The electric motor drives the gear to rotate. The gear drives the rack to translate. And, the rack drives the buffer mechanism to move.

In some embodiments, the power device further includes a thruster which is connected onto the vehicle body and provides power for navigation of the unmanned aerial vehicle on the water surface.

In some embodiments, the thruster is at least one of a pump jet thruster, a propeller thruster, and/or a spherical motor thruster.

In some embodiments, the power device further includes a connecting mechanism through which the thruster is connected onto the vehicle body. The connecting mechanism is a telescopic connecting mechanism. The connecting mechanism is capable of driving the thruster to keep away from or get close to the vehicle body.

In some embodiments, the connecting mechanism is a cylinder. The thruster is disposed on a drive rod of the cylinder. And, the cylinder drives the thruster to relatively keep away from or get close to the vehicle body through the drive rod.

In some embodiments, the connecting mechanism is a voice coil motor. The thruster is disposed on a driving end of the voice coil motor. And, the voice coil motor drives the thruster to relatively keep away from or get close to the vehicle body through the driving end.

In some embodiments, the connecting mechanism is a linear motor. The thruster is disposed on a rotator of the linear motor. And, the linear motor drives the thruster to relatively keep away from or get close to the vehicle body through the rotator.

In some embodiments, the connecting mechanism includes a guide rail, an electromagnet, and a permanent magnet. The guide rail is connected onto the vehicle body. The thruster is slidably disposed on the guide rail. One of the electromagnet and the permanent magnet is disposed on the thruster. The other one of the electromagnet and the permanent magnet is disposed on the vehicle body. By controlling a direction of a current on the electromagnet, the electromagnet attracts or repels the permanent magnet to cause the thruster to relatively keep away from or get close to the vehicle body along the guide rail.

In some embodiments, the connecting mechanism includes an electric motor, a lead screw, and a nut. The electric motor is connected onto the vehicle body. The lead screw is in a coaxial fixed connection with a driving shaft of the electric motor. And, the nut is sleeved on the lead screw and connected with the thruster. The electric motor drives the lead screw to rotate. The lead screw is combined with the nut by thread to drive the nut to move relative to the lead screw. And, the nut drives the thruster to move.

In some embodiments, the connecting mechanism includes an electric motor, a gear, and a rack. The electric motor is connected onto the vehicle body. The gear is connected onto a driving shaft of the electric motor. The rack meshes with the gear. And, the thruster is mounted on the rack. The electric motor drives the gear to rotate. The gear drives the rack to translate. And, the rack drives the thruster to move.

In some embodiments, the power device further includes a rotor assembly which is rotatably connected onto the vehicle body. When the unmanned aerial vehicle operates aerially, the control device is capable of controlling the rotor assembly to operate to provide power for aerial flight of the unmanned aerial vehicle. When the unmanned aerial vehicle navigates on the water surface, the control device is capable of controlling the rotor assembly to rotate a predetermined angle relative to the vehicle body and operate, which provides power for navigation of the unmanned aerial vehicle.

In some embodiments, the fuselage further includes a plurality of vehicle arms disposed on the vehicle body. There are a plurality of rotor assemblies. The plurality of vehicle arms are disposed around the vehicle body. And, each of the rotor assemblies is rotatably mounted on the vehicle arms.

In some embodiments, the rotor assembly includes a mounting member rotatably disposed on the vehicle arms. The control device is capable of controlling the mounting member to rotate relative to the vehicle arms.

In some embodiments, the rotor assembly further includes a driving member and a propeller. The driving member is disposed on the mounting member while the propeller is disposed on the driving member.

In some embodiments, the control device further includes a satellite positioner which tracks the geographic location of the unmanned aerial vehicle in real time.

In some embodiments, the control device further includes a magnetic field sensor which tracks a travel direction of the unmanned aerial vehicle in real time. It determines geographic orientation information of the unmanned aerial vehicle jointly with the satellite positioner.

In some embodiments, the magnetic field sensor is a compass.

In some embodiments, the control device further includes a main controller with which the power device, the takeoff and landing device and the landing surface detection assembly are electrically connected respectively.

An unmanned aerial vehicle control system, which operates on an unmanned aerial vehicle, includes a control device, a power device and a takeoff and landing device. The control device is used for controlling the power device to operate to provide power for travel of the unmanned aerial vehicle and is further used for controlling the takeoff and landing device to move to serve as a support when the unmanned aerial vehicle lands.

The unmanned aerial vehicle control system includes:

a central control module configured to receive a control instruction of takeoff, travel or landing of the unmanned aerial vehicle;

an environment detection module configured to detect an object type of a landing destination of the unmanned aerial vehicle when the central control module receives a landing control instruction; and a landing control module configured to control the takeoff and landing device to switch to an on-water landing mode when the environment detection module detects that the landing destination is a water surface.

In some embodiments, the landing control module includes an on-water landing control unit which is used for controlling the takeoff and landing device to switch to the on-water landing mode.

In some embodiments, the landing control module further includes a land landing control unit which is used for controlling the takeoff and landing device to switch to a land landing mode when the environment detection module detects that the landing destination is a non-water surface.

In some embodiments, the environment detection module is further used for detecting a distance between the unmanned aerial vehicle and the landing destination. If the distance falls within a pre-set distance range, the landing control module is allowed to control the takeoff and landing device to switch to a landing mode.

In some embodiments, if the environment detection module determines that the distance between the unmanned aerial vehicle and the landing destination does not fall within the pre-set distance range, the travel control module is used for controlling the power device to operate to reduce flight altitude of the unmanned aerial vehicle.

In some embodiments, the environment detection module is used for detecting the distance between the unmanned aerial vehicle and the landing destination in real time.

In some embodiments, the environment detection module is used for detecting the distance between the unmanned aerial vehicle and the landing destination at an interval.

In some embodiments, the environment detection module is further used for, after detecting that the landing destination is a water surface, further detecting the depth of the water. If the depth is falls within a pre-set depth range, the landing control module does not control the takeoff and landing device to act.

In some embodiments, the unmanned aerial vehicle control system further includes a takeoff control module which is used for controlling the power device to operate to drive the unmanned aerial vehicle to lift and take off when the central control module receives a takeoff control instruction.

In some embodiments, the unmanned aerial vehicle control system further includes a self-checking module. The unmanned aerial vehicle further includes a self-checking device. And, the self-checking module is used for, after the central control module receives the takeoff control instruction, controlling the self-checking device to check an operating state of the unmanned aerial vehicle. If the state of the unmanned aerial vehicle is suitable for flying, the takeoff control module is allowed to control the power device to operate. It drives the unmanned aerial vehicle to lift and take off.

In some embodiments, the unmanned aerial vehicle control system further includes a travel control module which is used for controlling the power device to operate when the central control module receives a travel control instruction. It enables the unmanned aerial vehicle to fly in the air or navigate on the water surface.

An unmanned aerial vehicle landing control method is applicable to an unmanned aerial vehicle. The unmanned aerial vehicle includes a control device, a power device and a takeoff and landing device. The control device is used for controlling the power device to operate to provide power for travel of the unmanned aerial vehicle, and further used for controlling the takeoff and landing device to move to serve as a support when the unmanned aerial vehicle lands.

The unmanned aerial vehicle landing control method includes:

Receiving an unmanned aerial vehicle landing control instruction;

Detecting an object type of a landing destination of the unmanned aerial vehicle;

If the landing destination is a water surface, the takeoff and landing device is controlled to switch to an on-water landing mode. If the landing destination is a non-water surface, the takeoff and landing device is controlled to switch to a land landing mode; and Controlling the power device to operate to reduce flight altitude of the unmanned aerial vehicle until the unmanned aerial vehicle lands to the destination.

In some embodiments, after it is determined that the landing destination is the water surface, the depth of the water is detected. If the depth falls within a pre-set depth range, the takeoff and landing device is controlled not to act.

In some embodiments, before the detecting an object type of a landing destination, a distance between the unmanned aerial vehicle and the landing destination is detected. If the distance falls within a pre-set distance range, the takeoff and landing device is controlled to switch a landing mode.

In some embodiments, if it is determined that the distance between the unmanned aerial vehicle and the landing destination does not fall within the pre-set distance range, the power device is controlled to operate to reduce the flight altitude of the unmanned aerial vehicle.

In some embodiments, when the distance between the unmanned aerial vehicle and the landing destination is detected, the detection is carried out at an interval.

In some embodiments, when the distance between the unmanned aerial vehicle and the landing destination is detected, the detection is carried out in real time.

In some embodiments, upon receipt of the unmanned aerial vehicle landing control instruction, geographic orientation of the unmanned aerial vehicle is positioned preliminarily to pre-determine whether the unmanned aerial vehicle is to land on the water surface.

An unmanned aerial vehicle control method is applicable to an unmanned aerial vehicle. The unmanned aerial vehicle includes a control device, a power device and a takeoff and landing device. The control device is used for controlling the power device to operate to provide power for travel of the unmanned aerial vehicle, and further used for controlling the takeoff and landing device to move to serve as a support when the unmanned aerial vehicle lands;

The unmanned aerial vehicle control method includes:

Receiving an unmanned aerial vehicle landing control instruction;

Detecting an object type of a landing destination of the unmanned aerial vehicle;

If the landing destination is a water surface, the takeoff and landing device is controlled to switch to an on-water landing mode. If the landing destination is a non-water surface, the takeoff and landing device is controlled to switch to a land landing mode; and Controlling the power device to operate to reduce flight altitude of the unmanned aerial vehicle until the unmanned aerial vehicle lands to the destination.

In some embodiments, after the landing destination is determined as the water surface, the depth of the water is detected. If the depth falls within a pre-set depth range, the takeoff and landing device is controlled not to act.

In some embodiments, before detecting an object type of a landing destination, a distance between the unmanned aerial vehicle and the landing destination is detected. If the distance falls within a pre-set distance range, the takeoff and landing device is controlled to switch a landing mode.

In some embodiments, if the distance between the unmanned aerial vehicle and the landing destination does not fall within the pre-set distance range, the power device is controlled to operate to reduce the flight altitude of the unmanned aerial vehicle.

In some embodiments, when the distance between the unmanned aerial vehicle and the landing destination is detected, the detection is carried out at an interval.

In some embodiments, when the distance between the unmanned aerial vehicle and the landing destination is detected, the detection is carried out in real time.

In some embodiments, upon receipt of the unmanned aerial vehicle landing control instruction, geographic orientation of the unmanned aerial vehicle is positioned preliminarily to pre-determine whether the unmanned aerial vehicle is to land on the water surface.

An unmanned aerial vehicle includes a fuselage and a power device connected onto the fuselage. The unmanned aerial vehicle further includes a control device and a takeoff and landing device disposed on the fuselage. The power device and the takeoff and landing device are electrically connected with the control device respectively. The control device is used for, upon receipt of a landing control instruction, controlling the power device and the takeoff and landing device to switch to a land landing mode or an on-water landing mode.

In some embodiments, the control device includes a main controller, which, upon receipt of a land landing control instruction, controls the power device and the takeoff and landing device to switch to the land landing mode.

In some embodiments, the control device includes a main controller, which, upon receipt of an on-water landing control instruction, controls the takeoff and landing device to switch to the on-water landing mode in a buoyancy support state, and controls the power device to drive the entire unmanned aerial vehicle to land to the water surface.

In some embodiments, the control device includes a distance sensor which is capable of detecting a distance between the unmanned aerial vehicle and the water surface. It allows the main controller to control the takeoff and landing device to enter into a ready-to-land state according to the distance.

In some embodiments, the distance sensor is at least one of a barometer, an ultrasonic range-finding sensor, a laser range-finding sensor, and/or a visual sensor.

In some embodiments, the distance sensor allows the main controller to control the takeoff and landing device to enter into the ready-to-land state according to the distance when the distance between the unmanned aerial vehicle and the water surface is within a pre-set range.

In some embodiments, the control device further includes a depth detector which is capable of detecting the depth of the water. The main controller is capable of controlling the power device not to drive the entire unmanned aerial vehicle to land when the depth detector determines that the depth falls within a pre-set depth range.

In some embodiments, the depth detector is a water depth detecting instrument.

In some embodiments, the unmanned aerial vehicle further includes an alarm which is capable of sending a warning signal to a user of the unmanned aerial vehicle to indicate that the landing destination is not suitable for landing when the depth detector determines that the depth falls within a pre-set depth range.

In some embodiments, the alarm is a warning light, a buzzer, or an electronic information sender.

In some embodiments, the fuselage includes a vehicle body on which both the takeoff and landing device and the power device are disposed. The takeoff and landing device includes a suspension device which is capable of providing buoyance support when the unmanned aerial vehicle lands on the water surface to navigate.

In some embodiments, the suspension device is an inflatable buoyancy plate.

In some embodiments, the suspension device is a buoyancy plate made of a solid buoyancy material.

In some embodiments, the suspension device includes a bottom plate and a side plate disposed on a peripheral edge of the bottom plate between which a predetermined angle is formed.

In some embodiments, the side plate is adjustably mounted on the bottom plate. The angle formed between the bottom plate and the side plate is adjustable.

In some embodiments, the bottom plate is adjustably connected onto the vehicle body. An angle formed between the bottom plate and the vehicle body is adjustable.

In some embodiments, the suspension device is circularly disposed outside the vehicle body.

In some embodiments, the suspension device coats all or some structures of the vehicle body therein.

In some embodiments, the takeoff and landing device further includes a landing gear disposed on the vehicle body, and the suspension device is disposed on the landing gear.

In some embodiments, the landing gear includes a supporting mechanism disposed on the vehicle body and a buffer mechanism disposed on the supporting mechanism.

In some embodiments, the buffer mechanism is a buffer member made of an elastic material.

In some embodiments, the buffer mechanism is at least one of a pneumatic damper, a hydraulic damper and a spring damper.

In some embodiments, the supporting mechanism is a telescopic supporting mechanism. The supporting mechanism is capable of driving the buffer mechanism to relatively keep away from or get close to the vehicle body.

In some embodiments, the supporting mechanism is a cylinder. The buffer mechanism is disposed on a drive rod of the cylinder. And, the cylinder drives the buffer mechanism to relatively keep away from or get close to the vehicle body through the drive rod.

In some embodiments, the supporting mechanism is a voice coil motor. The buffer mechanism is disposed on a driving end of the voice coil motor. And, the voice coil motor drives the buffer mechanism to relatively keep away from or get close to the vehicle body through the driving end.

In some embodiments, the supporting mechanism is a linear motor. The buffer mechanism is disposed on a rotator of the linear motor. And, the linear motor drives the buffer mechanism to relatively keep away from or get close to the vehicle body through the rotator.

In some embodiments, the supporting mechanism includes a guide rail, an electromagnet and a permanent magnet. The guide rail is connected onto the vehicle body. And the buffer mechanism is slidably disposed on the guide rail. One of the electromagnet and the permanent magnet is disposed on the buffer mechanism. The other one of the electromagnet and the permanent magnet is disposed on the vehicle body. By controlling a direction of a current on the electromagnet, the electromagnet attracts or repels the permanent magnet to cause the buffer mechanism to relatively keep away from or get close to the vehicle body along the guide rail.

In some embodiments, the supporting mechanism includes an electric motor, a lead screw, and a nut. The electric motor is connected onto the vehicle body. The lead screw is in a coaxial fixed connection with a driving shaft of the electric motor. And, the nut is sleeved on the lead screw and connected with the buffer mechanism. The electric motor drives the lead screw to rotate. The lead screw is combined with the nut by thread to drive the nut to move relative to the lead screw. And, the nut drives the buffer mechanism to move.

In some embodiments, the supporting mechanism includes an electric motor, a gear, and a rack. The electric motor is connected onto the vehicle body. The gear is connected onto a driving shaft of the electric motor. The rack meshes with the gear, and the buffer mechanism is mounted on the rack. The electric motor drives the gear to rotate. The gear drives the rack to translate. And, the rack drives the buffer mechanism to move.

In some embodiments, the power device further includes a thruster which is connected onto the vehicle body and provides power for navigation of the unmanned aerial vehicle on the water surface.

In some embodiments, the thruster is at least one of a pump jet thruster, a propeller thruster, and/or a spherical motor thruster.

In some embodiments, the power device further includes a connecting mechanism through which the thruster is connected onto the vehicle body. The connecting mechanism is a telescopic connecting mechanism. The connecting mechanism is capable of driving the thruster to keep away from or get close to the vehicle body.

In some embodiments, the connecting mechanism is a cylinder. The thruster is disposed on a drive rod of the cylinder. And, the cylinder drives the thruster to relatively keep away from or get close to the vehicle body through the drive rod.

In some embodiments, the connecting mechanism is a voice coil motor. The thruster is disposed on a driving end of the voice coil motor. And, the voice coil motor drives the thruster to relatively keep away from or get close to the vehicle body through the driving end.

In some embodiments, the connecting mechanism is a linear motor. The thruster is disposed on a rotator of the linear motor. And the linear motor drives the thruster to relatively keep away from or get close to the vehicle body through the rotator.

In some embodiments, the connecting mechanism includes a guide rail, an electromagnet, and a permanent magnet. The guide rail is connected onto the vehicle body. And, the thruster is slidably disposed on the guide rail. One of the electromagnet and the permanent magnet is disposed on the thruster while the other one of the electromagnet and the permanent magnet is disposed on the vehicle body. By controlling a direction of a current on the electromagnet, the electromagnet attracts or repels the permanent magnet to cause the thruster to relatively keep away from or get close to the vehicle body along the guide rail.

In some embodiments, the connecting mechanism includes an electric motor, a lead screw, and a nut, The electric motor is connected onto the vehicle body. The lead screw is in a coaxial fixed connection with a driving shaft of the electric motor. And, the nut is sleeved on the lead screw and connected with the thruster. The electric motor drives the lead screw to rotate. The lead screw is combined with the nut by thread to drive the nut to move relative to the lead screw. The nut drives the thruster to move.

In some embodiments, the connecting mechanism includes an electric motor, a gear, and a rack. The electric motor is connected onto the vehicle body. The gear is connected onto a driving shaft of the electric motor. The rack meshes with the gear. The thruster is mounted on the rack. The electric motor drives the gear to rotate. The gear drives the rack to translate. And, the rack drives the thruster to move.

In some embodiments, the power device further includes a rotor assembly which is rotatably connected onto the vehicle body. When the unmanned aerial vehicle operates aerially, the control device is capable of controlling the rotor assembly to operate to provide power for aerial flight of the unmanned aerial vehicle. When the unmanned aerial vehicle navigates on the water surface, the control device is capable of controlling the rotor assembly to rotate a predetermined angle relative to the vehicle body and operate, which provides power for navigation of the unmanned aerial vehicle.

In some embodiments, the fuselage further includes a plurality of vehicle arms disposed on the vehicle body. There are a plurality of rotor assemblies. The plurality of vehicle arms are disposed around the vehicle body, and each of the rotor assemblies is rotatably mounted on the vehicle arms.

In some embodiments, the rotor assembly includes a mounting member rotatably disposed on the vehicle arms. The control device is capable of controlling the mounting member to rotate relative to the vehicle arms.

In some embodiments, the rotor assembly further includes a driving member and a propeller. The driving member is disposed on the mounting member, and the propeller is disposed on the driving member.

In some embodiments, the control device further includes a satellite positioner which tracks the geographic location of the unmanned aerial vehicle in real time.

In some embodiments, the control device further includes a magnetic field sensor which tracks a travel direction of the unmanned aerial vehicle in real time. It determines geographic orientation information of the unmanned aerial vehicle jointly with the satellite positioner.

In some embodiments, the magnetic field sensor is a compass.

An unmanned aerial vehicle control system, which operates on an unmanned aerial vehicle, includes a control device, a power device, and a takeoff and landing device. The control device is used for controlling the power device to operate to provide power for travel of the unmanned aerial vehicle, and further used for controlling the takeoff and landing device to move to serve as a support when the unmanned aerial vehicle lands.

The unmanned aerial vehicle control system includes:

A central control module configured to receive a control instruction of takeoff, travel, or landing of the unmanned aerial vehicle, and A landing control module configured to control the takeoff and landing device to switch to a land landing mode or an on-water landing mode corresponding to a landing destination when the central control module receives a landing control instruction.

In some embodiments, the landing control module includes an on-water landing control unit which is used for controlling the takeoff and landing device to switch to the on-water landing mode when the central control module receives an on-water landing control instruction.

In some embodiments, the landing control module further includes a land landing control unit which is used for controlling the takeoff and landing device to switch to the land landing mode when the central control module receives a land landing control instruction.

In some embodiments, the unmanned aerial vehicle control system further includes an environment detection module which is used for detecting a distance between the unmanned aerial vehicle and the landing destination. If the distance falls within a pre-set distance range, the landing control module is allowed to control the takeoff and landing device to switch a landing mode.

In some embodiments, if the environment detection module determines that the distance between the unmanned aerial vehicle and the landing destination does not fall within the pre-set distance range, the travel control module is used for controlling the power device to operate to reduce flight altitude of the unmanned aerial vehicle.

In some embodiments, the environment detection module is used for detecting the distance between the unmanned aerial vehicle and the landing destination in real time.

In some embodiments, the environment detection module is used for detecting the distance between the unmanned aerial vehicle and the landing destination at an interval.

In some embodiments, the environment detection module is further used for, after the central control module receives a land landing control instruction, detecting the depth of the water. If the depth falls within a pre-set depth range, the landing control module does not control the takeoff and landing device to act.

In some embodiments, the unmanned aerial vehicle control system further includes a takeoff control module which is used for controlling the power device to operate to drive the unmanned aerial vehicle to lift and take off when the central control module receives a takeoff control instruction.

In some embodiments, the unmanned aerial vehicle control system further includes a self-checking module. The unmanned aerial vehicle further includes a self-checking device. The self-checking module is used for, after the central control module receives the takeoff control instruction, controlling the self-checking device to check an operating state of the unmanned aerial vehicle. If the state of the unmanned aerial vehicle is suitable for flying, the takeoff control module is allowed to control the power device to operate to drive the unmanned aerial vehicle to lift and take off.

In some embodiments, the unmanned aerial vehicle control system further includes a travel control module which is used for controlling the power device to operate when the central control module receives a travel control instruction. It enables the unmanned aerial vehicle to fly in the air or navigate on the water surface.

An unmanned aerial vehicle landing control method is applicable to an unmanned aerial vehicle. The unmanned aerial vehicle includes a control device, a power device, and a takeoff and landing device. The control device is used for controlling the power device to operate to provide power for travel of the unmanned aerial vehicle and further used for controlling the takeoff and landing device to move to serve as a support when the unmanned aerial vehicle lands.

The unmanned aerial vehicle landing control method includes:

Receiving an unmanned aerial vehicle landing control instruction,

Controlling the takeoff and landing device to switch to an on-water landing mode or a land landing mode according to the landing control instruction, and Controlling the power device to operate to reduce flight altitude of the unmanned aerial vehicle until the unmanned aerial vehicle lands to a destination.

In some embodiments, if the control instruction is an on-water landing control instruction, the depth of the water is detected. If the depth falls within a pre-set depth range, the takeoff and landing device is controlled not to act.

In some embodiments, before the takeoff and landing device is controlled to switch a landing mode, a distance between the unmanned aerial vehicle and the landing destination is detected. If the distance falls within a pre-set distance range, the takeoff and landing device is controlled to switch the landing mode.

In some embodiments, if the distance between the unmanned aerial vehicle and the landing destination does not fall within the pre-set distance range, the power device is controlled to operate to reduce the flight altitude of the unmanned aerial vehicle.

In some embodiments, when the distance between the unmanned aerial vehicle and the landing destination is detected, the detection is carried out at an interval.

In some embodiments, when the distance between the unmanned aerial vehicle and the landing destination is detected, the detection is carried out in real time.

An unmanned aerial vehicle control method is applicable to an unmanned aerial vehicle which includes a control device, a power device, and a takeoff and landing device. The control device is used for controlling the power device to operate to provide power for travel of the unmanned aerial vehicle, and further used for controlling the takeoff and landing device to move to serve as a support when the unmanned aerial vehicle lands.

The unmanned aerial vehicle control method includes:

Receiving an unmanned aerial vehicle landing control instruction,

Controlling the takeoff and landing device to switch to an on-water landing mode or a land landing mode according to the landing control instruction, and Controlling the power device to operate to reduce flight altitude of the unmanned aerial vehicle until the unmanned aerial vehicle lands to a destination.

In some embodiments, after the control instruction is determined as an on-water landing control instruction, the depth of the water is detected. If it the depth falls within a pre-set depth range, the takeoff and landing device is controlled not to act.

In some embodiments, before the takeoff and landing device is controlled to switch a landing mode, a distance between the unmanned aerial vehicle and the landing destination is detected. If the distance falls within a pre-set distance range, the takeoff and landing device is controlled to switch the landing mode.

In some embodiments, if it is determined that the distance between the unmanned aerial vehicle and the landing destination does not fall within the pre-set distance range, the power device is controlled to operate to reduce the flight altitude of the unmanned aerial vehicle.

In some embodiments, when the distance between the unmanned aerial vehicle and the landing destination is detected, the detection is carried out at an interval.

In some embodiments, when the distance between the unmanned aerial vehicle and the landing destination is detected, the detection is carried out in real time.

An unmanned aerial vehicle includes a fuselage, a power device connected onto the fuselage, and a control device disposed on the fuselage and electrically connected with the power device. The control device is used for controlling the power device to switch an operating mode. It enables the unmanned aerial vehicle to fly in the air or navigate on a water surface.

In some embodiments, the unmanned aerial vehicle further includes a takeoff and landing device electrically connected with the control device. The control device is further used for controlling the takeoff and landing device to switch an operating mode, to enable the unmanned aerial vehicle to land on the land or the water surface.

In some embodiments, the control device includes a main controller. The main controller, upon receipt of a land landing control instruction, controls the power device and the takeoff and landing device to switch to a land landing mode.

In some embodiments, the control device includes a main controller. The main controller, upon receipt of an on-water landing control instruction, controls the takeoff and landing device to switch to an on-water landing mode in a buoyancy support state, and controls the power device to drive the entire unmanned aerial vehicle to land to the water surface.

In some embodiments, the control device includes a distance sensor which is capable of detecting a distance between the unmanned aerial vehicle and the water surface. It allows the main controller to control the takeoff and landing device to enter into a ready-to-land state according to the distance.

In some embodiments, the distance sensor is at least one of a barometer, an ultrasonic range-finding sensor, a laser range-finding sensor, and/or a visual sensor.

In some embodiments, the distance sensor allows the main controller to control the takeoff and landing device to enter into the ready-to-land state according to the distance when the distance between the unmanned aerial vehicle and the water surface is within a pre-set range.

In some embodiments, the control device further includes a depth detector which is capable of detecting the depth of the water. The main controller is capable of controlling the power device not to drive the entire unmanned aerial vehicle to land when the depth detector determines that the depth falls within a pre-set depth range.

In some embodiments, the depth detector is a water depth detecting instrument.

In some embodiments, the unmanned aerial vehicle further includes an alarm which is capable of sending a warning signal to a user of the unmanned aerial vehicle to indicate that the landing destination is not suitable for landing when the depth detector determines that the depth falls within a pre-set depth range.

In some embodiments, the alarm is a warning light, a buzzer, or an electronic information sender.

In some embodiments, the fuselage includes a vehicle body on which both the takeoff and landing device and the power device are disposed. The takeoff and landing device includes a suspension device which is capable of providing buoyance support when the unmanned aerial vehicle lands on the water surface to navigate.

In some embodiments, the suspension device is an inflatable buoyancy plate.

In some embodiments, the suspension device is a buoyancy plate made of a solid buoyancy material.

In some embodiments, the suspension device includes a bottom plate and a side plate disposed on a peripheral edge of the bottom plate between which a predetermined angle is formed.

In some embodiments, the side plate is adjustably mounted on the bottom plate, and the angle formed between the bottom plate and the side plate is adjustable.

In some embodiments, the bottom plate is adjustably connected onto the vehicle body, and an angle formed between the bottom plate and the vehicle body is adjustable.

In some embodiments, the suspension device is circularly disposed outside the vehicle body.

In some embodiments, the suspension device coats all or some structures of the vehicle body therein.

In some embodiments, the takeoff and landing device further includes a landing gear disposed on the vehicle body, and the suspension device is disposed on the landing gear.

In some embodiments, the landing gear includes a supporting mechanism disposed on the vehicle body and a buffer mechanism disposed on the supporting mechanism.

In some embodiments, the buffer mechanism is a buffer member made of an elastic material.

In some embodiments, the buffer mechanism is at least one of a pneumatic damper, a hydraulic damper, and/or a spring damper.

In some embodiments, the supporting mechanism is a telescopic supporting mechanism. The supporting mechanism is capable of driving the buffer mechanism to relatively keep away from or get close to the vehicle body.

In some embodiments, the supporting mechanism is a cylinder. The buffer mechanism is disposed on a drive rod of the cylinder. And, the cylinder drives the buffer mechanism to relatively keep away from or get close to the vehicle body through the drive rod.

In some embodiments, the supporting mechanism is a voice coil motor. The buffer mechanism is disposed on a driving end of the voice coil motor. And, the voice coil motor drives the buffer mechanism to relatively keep away from or get close to the vehicle body through the driving end.

In some embodiments, the supporting mechanism is a linear motor. The buffer mechanism is disposed on a rotator of the linear motor. And, the linear motor drives the buffer mechanism to relatively keep away from or get close to the vehicle body through the rotator.

In some embodiments, the supporting mechanism includes a guide rail, an electromagnet, and a permanent magnet. The guide rail is connected onto the vehicle body while the buffer mechanism is slidably disposed on the guide rail. One of the electromagnet and the permanent magnet is disposed on the buffer mechanism. The other one of the electromagnet and the permanent magnet is disposed on the vehicle body. By controlling a direction of a current on the electromagnet, the electromagnet attracts or repels the permanent magnet to cause the buffer mechanism to relatively keep away from or get close to the vehicle body along the guide rail.

In some embodiments, the supporting mechanism includes an electric motor, a lead screw, and a nut. The electric motor is connected onto the vehicle body. The lead screw is in a coaxial fixed connection with a driving shaft of the electric motor. And, the nut is sleeved on the lead screw and connected with the buffer mechanism. The electric motor drives the lead screw to rotate. The lead screw is combined with the nut by thread to drive the nut to move relative to the lead screw. And, the nut drives the buffer mechanism to move.

In some embodiments, the supporting mechanism includes an electric motor, a gear and a rack. The electric motor is connected onto the vehicle body. The gear is connected onto a driving shaft of the electric motor. The rack meshes with the gear, while the buffer mechanism is mounted on the rack. The electric motor drives the gear to rotate. The gear drives the rack to translate. The rack drives the buffer mechanism to move.

In some embodiments, the power device further includes a thruster which is connected onto the vehicle body and provides power for navigation of the unmanned aerial vehicle on the water surface.

In some embodiments, the thruster is at least one of a pump jet thruster, a propeller thruster, and/or a spherical motor thruster.

In some embodiments, the power device further includes a connecting mechanism through which the thruster is connected onto the vehicle body. The connecting mechanism is a telescopic connecting mechanism. In addition, the connecting mechanism is capable of driving the thruster to keep away from or get close to the vehicle body.

In some embodiments, the connecting mechanism is a cylinder. The thruster is disposed on a drive rod of the cylinder. And, the cylinder drives the thruster to relatively keep away from or get close to the vehicle body through the drive rod.

In some embodiments, the connecting mechanism is a voice coil motor. The thruster is disposed on a driving end of the voice coil motor. And, the voice coil motor drives the thruster to relatively keep away from or get close to the vehicle body through the driving end.

In some embodiments, the connecting mechanism is a linear motor. The thruster is disposed on a rotator of the linear motor. And, the linear motor drives the thruster to relatively keep away from or get close to the vehicle body through the rotator.

In some embodiments, the connecting mechanism includes a guide rail, an electromagnet, and a permanent magnet. The guide rail is connected onto the vehicle body while the thruster is slidably disposed on the guide rail. One of the electromagnet and the permanent magnet is disposed on the thruster. The other one of the electromagnet and the permanent magnet is disposed on the vehicle body. By controlling a direction of a current on the electromagnet, the electromagnet attracts or repels the permanent magnet to cause the thruster to relatively keep away from or get close to the vehicle body along the guide rail.

In some embodiments, the connecting mechanism includes an electric motor, a lead screw, and a nut. The electric motor is connected onto the vehicle body. The lead screw is in a coaxial fixed connection with a driving shaft of the electric motor. The nut is sleeved on the lead screw and connected with the thruster. The electric motor drives the lead screw to rotate. The lead screw is combined with the nut by thread to drive the nut to move relative to the lead screw. And, the nut drives the thruster to move.

In some embodiments, the connecting mechanism includes an electric motor, a gear, and a rack. The electric motor is connected onto the vehicle body. The gear is connected onto a driving shaft of the electric motor. The rack meshes with the gear while the thruster is mounted on the rack. The electric motor drives the gear to rotate. The gear drives the rack to translate. And, the rack drives the thruster to move.

In some embodiments, the power device further includes a rotor assembly which is rotatably connected onto the vehicle body. When the unmanned aerial vehicle operates aerially, the control device is capable of controlling the rotor assembly to operate to provide power for aerial flight of the unmanned aerial vehicle. When the unmanned aerial vehicle navigates on the water surface, the control device is capable of controlling the rotor assembly to rotate a predetermined angle relative to the vehicle body and operate, which provides power for navigation of the unmanned aerial vehicle.

In some embodiments, the fuselage further includes a plurality of vehicle arms disposed on the vehicle body. There are a plurality of rotor assemblies. The plurality of vehicle arms are disposed around the vehicle body, and each of the rotor assemblies is rotatably mounted on the vehicle arms.

In some embodiments, the rotor assembly includes a mounting member rotatably disposed on the vehicle arms. The control device is capable of controlling the mounting member to rotate relative to the vehicle arms.

In some embodiments, the rotor assembly further includes a driving member and a propeller. The driving member is disposed on the mounting member. The propeller is disposed on the driving member.

In some embodiments, the control device further includes a satellite positioner which tracks the geographic location of the unmanned aerial vehicle in real time.

In some embodiments, the control device further includes a magnetic field sensor which tracks a travel direction of the unmanned aerial vehicle in real time. It determines geographic orientation information of the unmanned aerial vehicle jointly with the satellite positioner.

In some embodiments, the magnetic field sensor is a compass.

An unmanned aerial vehicle control system operates on an unmanned aerial vehicle. The unmanned aerial vehicle includes a control device and a power device. The control device is used for controlling the power device to operate to provide power for travel of the unmanned aerial vehicle. The unmanned aerial vehicle control system includes a central control module configured to receive a control instruction of takeoff, travel, or landing of the unmanned aerial vehicle, and configured to allow the control device to control the power device to switch an operating mode. It enables the unmanned aerial vehicle to fly in the air or navigate on a water surface.

In some embodiments, the unmanned aerial vehicle control system further includes an on-water landing control unit which is used for controlling the takeoff and landing device to switch to an on-water landing mode.

In some embodiments, the unmanned aerial vehicle control system further includes a land landing control unit which is used for controlling the takeoff and landing device to switch to a land landing mode.

In some embodiments, the unmanned aerial vehicle control system further includes an environment detection module which is used for detecting a distance between the unmanned aerial vehicle and a landing destination of the unmanned aerial vehicle. If the distance falls within a pre-set distance range, the landing control module is allowed to control the takeoff and landing device to switch a landing mode.

In some embodiments, if the environment detection module determines that the distance between the unmanned aerial vehicle and the landing destination does not fall within the pre-set distance range, the travel control module is used for controlling the power device to operate to reduce flight altitude of the unmanned aerial vehicle.

In some embodiments, the environment detection module is used for detecting the distance between the unmanned aerial vehicle and the landing destination in real time.

In some embodiments, the environment detection module is used for detecting the distance between the unmanned aerial vehicle and the landing destination at an interval.

In some embodiments, the unmanned aerial vehicle control system further includes a takeoff control module which is used for controlling the power device to operate to drive the unmanned aerial vehicle to lift and take off when the central control module receives a takeoff control instruction.

In some embodiments, the unmanned aerial vehicle control system further includes a self-checking module. The unmanned aerial vehicle further includes a self-checking device. And, the self-checking module is used for, after the central control module receives the takeoff control instruction, controlling the self-checking device to check an operating state of the unmanned aerial vehicle. If the state of the unmanned aerial vehicle is suitable for flying, the takeoff control module is allowed to control the power device to operate to drive the unmanned aerial vehicle to lift and take off.

In some embodiments, the unmanned aerial vehicle control system further includes a travel control module which is used for controlling the power device to operate when the central control module receives a travel control instruction. It enables the unmanned aerial vehicle to fly in the air or navigate on the water surface.

An unmanned aerial vehicle control method is applicable to an unmanned aerial vehicle. The unmanned aerial vehicle includes a control device and a power device. The control device is used for controlling the power device to operate to provide power for travel of the unmanned aerial vehicle. The unmanned aerial vehicle control method includes receiving an unmanned aerial vehicle control instruction, and controlling the power device to switch an operating mode, according to the control instruction, to enable the unmanned aerial vehicle to fly in the air or navigate on a water surface.

In some embodiments, after it is determined that the control instruction is a landing control instruction, a distance between the unmanned aerial vehicle and a landing destination of the unmanned aerial vehicle is detected. The power device is controlled to operate to reduce flight altitude of the unmanned aerial vehicle until the unmanned aerial vehicle lands.

In some embodiments, when the distance between the unmanned aerial vehicle and the landing destination is detected, the detection is carried out at an interval.

In some embodiments, when the distance between the unmanned aerial vehicle and the landing destination is detected, the detection is carried out in real time.

The unmanned aerial vehicle, the unmanned aerial vehicle control system and method, and the unmanned aerial vehicle landing control method according to the present disclosure detect an object type of a landing destination of the unmanned aerial vehicle through a landing surface detection assembly, and control the takeoff and landing device to switch to an operating state adapted to the object type according to the object type. If the landing surface detection assembly detects that the landing destination is a liquid surface such as a water surface, it is feasible to, by controlling the takeoff and landing device to switch the operating mode, enable the unmanned aerial vehicle to smoothly land on the liquid surface and to navigate on the liquid. Therefore, the unmanned aerial vehicle can fly in the air and can also navigate on water.

DESCRIPTION ABOUT MAIN REFERENCE NUMERALS

TABLE 1

Figure 1:
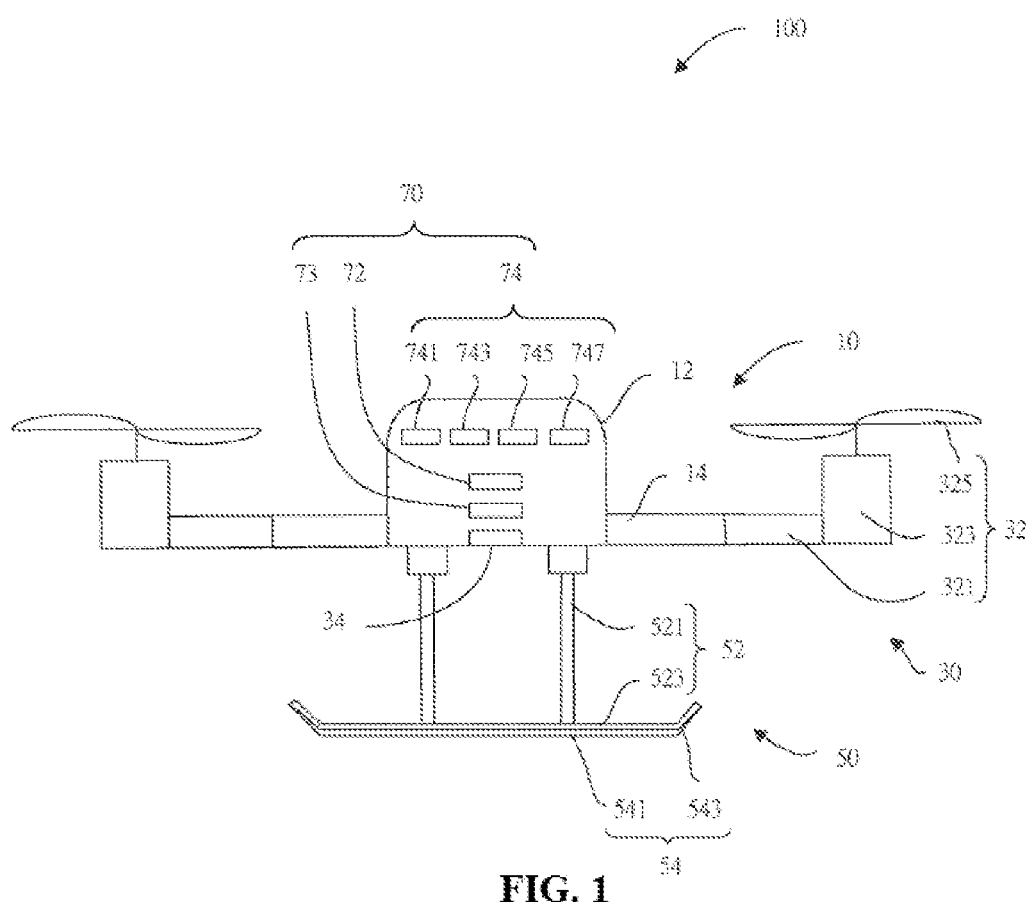
FIG. 1 is a schematic view illustrating that an unmanned aerial vehicle is in a first state according to a first implementation mode of the present disclosure. The first state may be a non-operating stationary state and may also be an aerial operating state.
Figure 2:
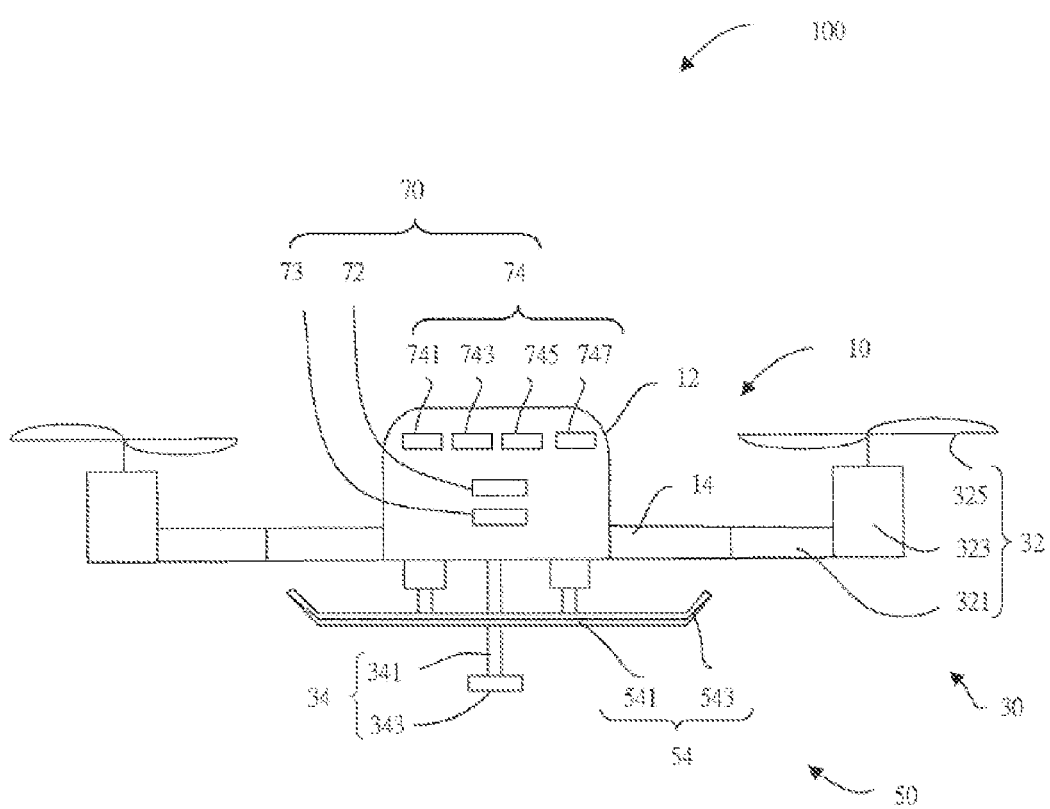
FIG. 2 is a schematic view illustrating that the unmanned aerial vehicle shown in FIG. 1 is in a second state. The second state may be a first ready state in which the unmanned aerial vehicle is to land to a water surface from the air and may also be a non-operating stationary state.
Figure 3:
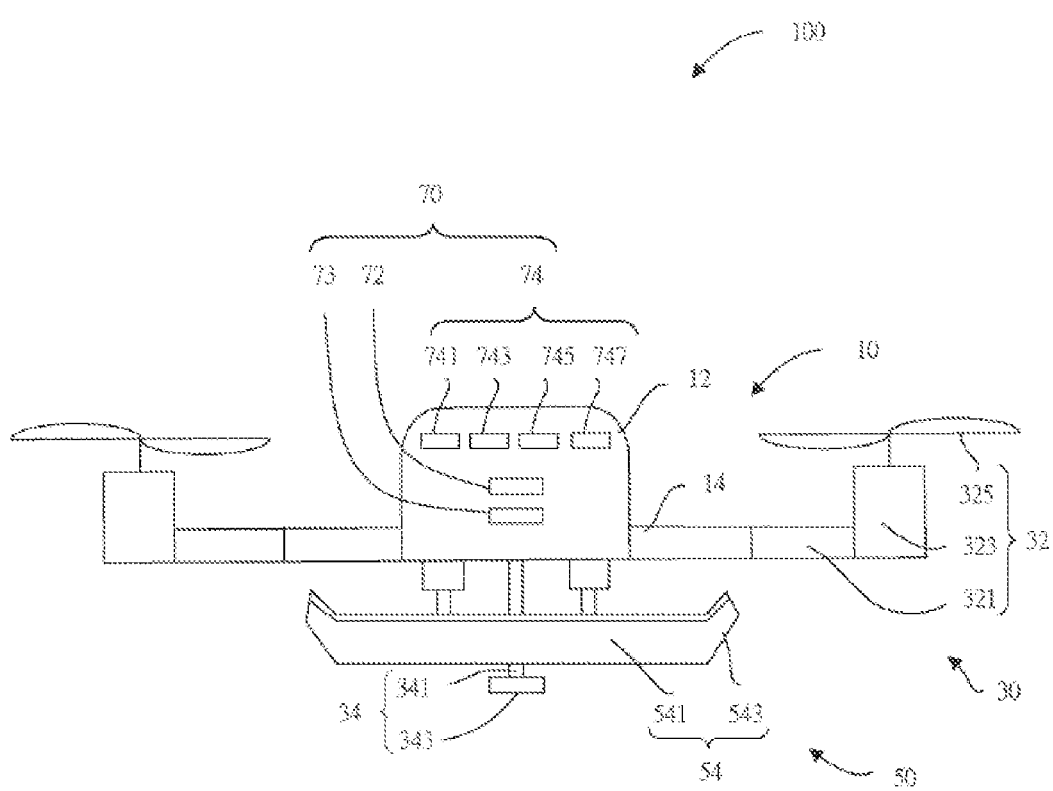
FIG. 3 is a schematic view illustrating that the unmanned aerial vehicle shown in FIG. 1 is in a third state. The third state may be a second ready state in which the unmanned aerial vehicle is to land to a water surface from the air. The state may be an on-water navigation/residing state. The stay may be a non-operating stationary state.
Figure 4:
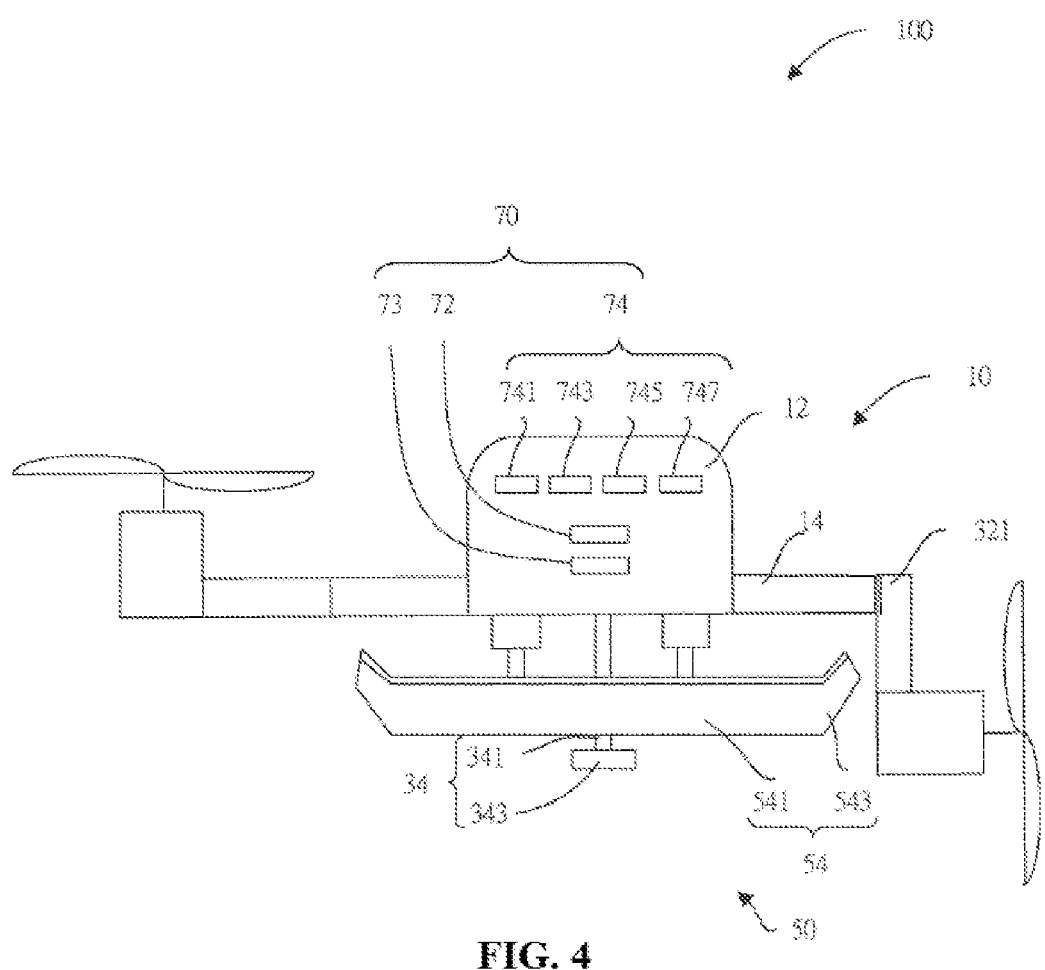
FIG. 4 is a schematic view illustrating that the unmanned aerial vehicle shown in FIG. 1 is in a fourth state. The fourth state may be an on-water navigation/residing state. The state may be a non-operating stationary state.
Figure 5:
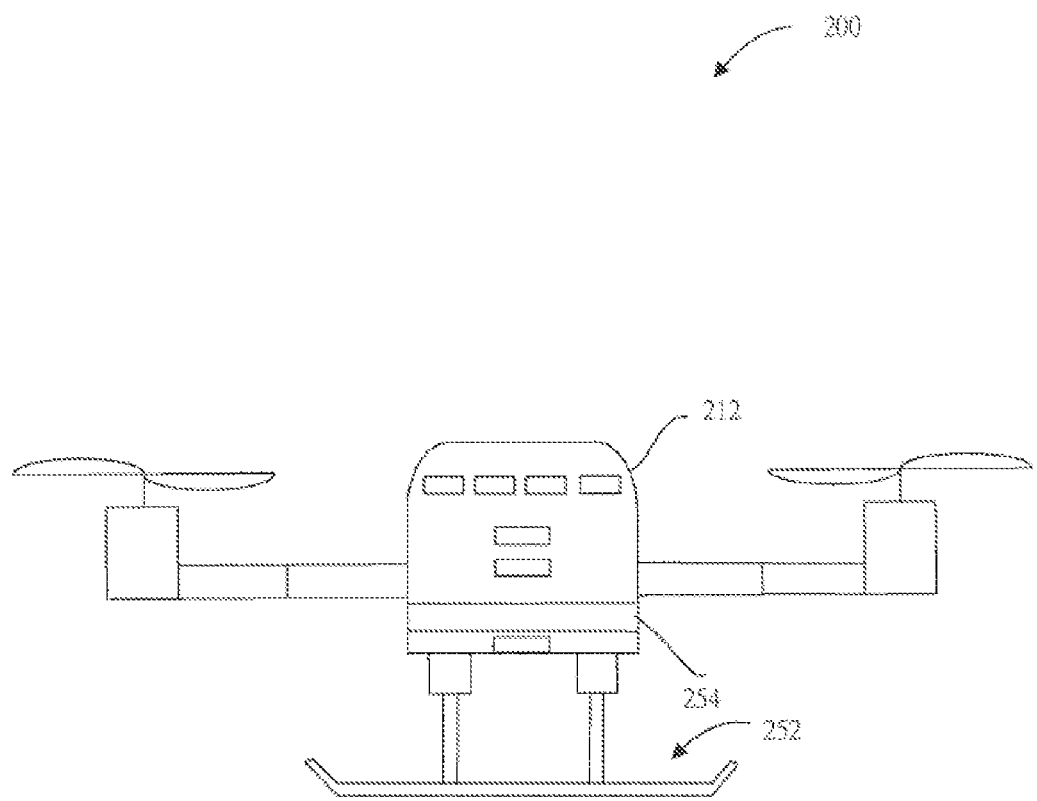
FIG. 5 is a schematic view illustrating that an unmanned aerial vehicle is in the first state according to a second implementation mode of the present disclosure.
Figure 6:
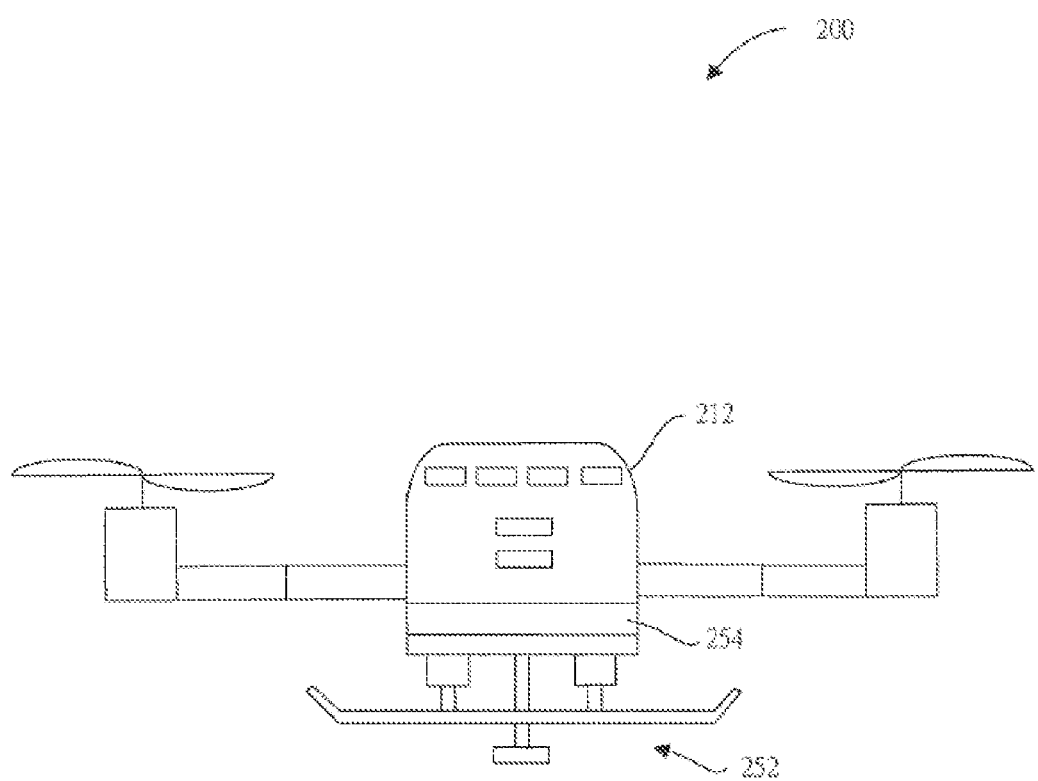
FIG. 6 is a schematic view illustrating that the unmanned aerial vehicle shown in FIG. 5 is in the second state.
Figure 7:
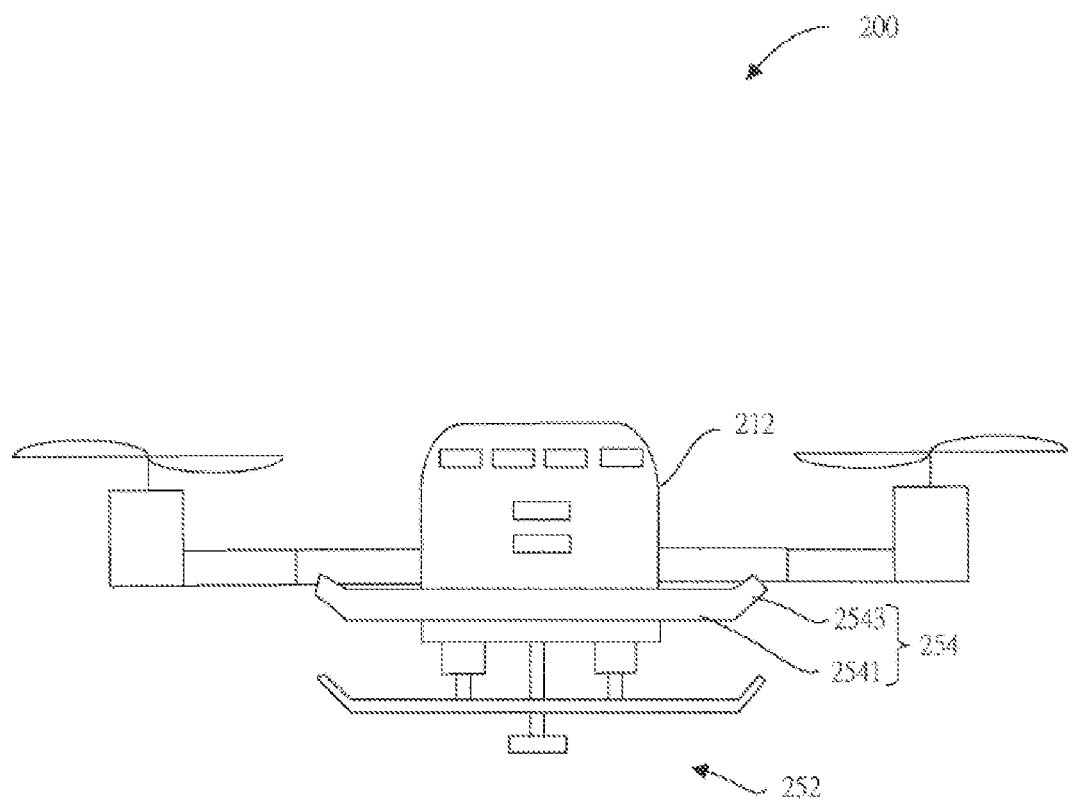
FIG. 7 is a schematic view illustrating that the unmanned aerial vehicle shown in FIG. 5 is in the third state.
Figure 8:
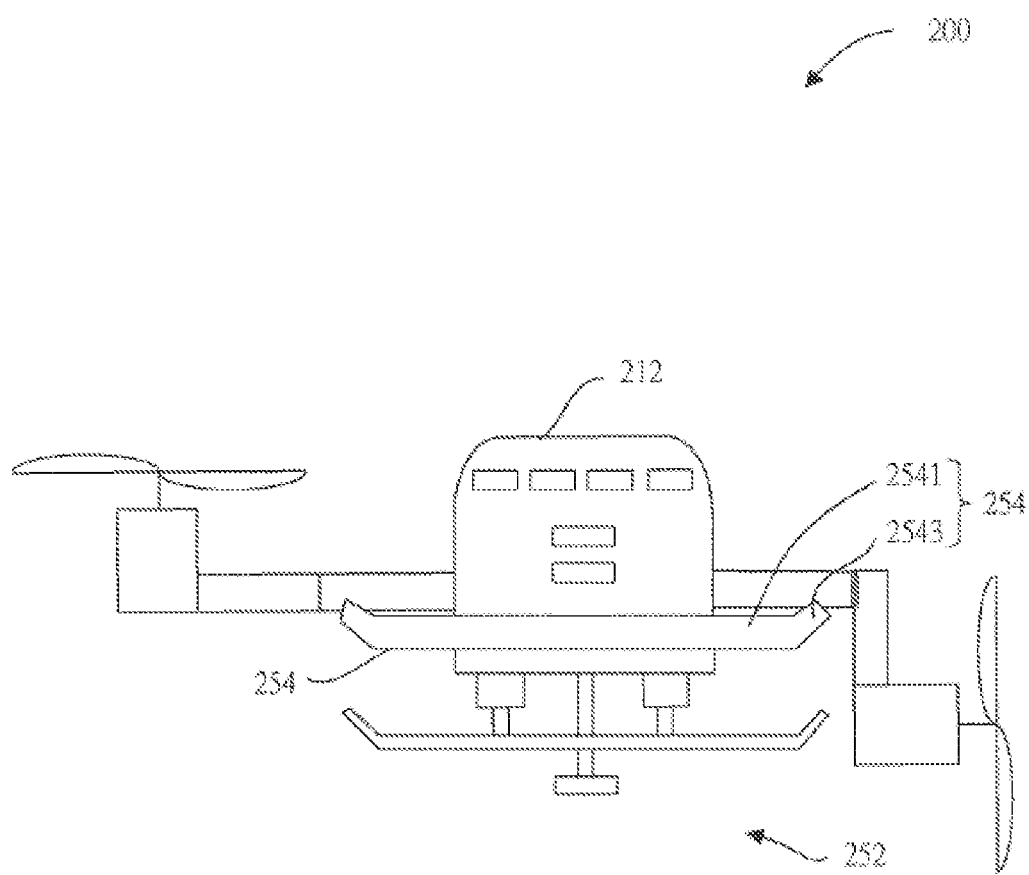
FIG. 8 is a schematic view illustrating that the unmanned aerial vehicle shown in FIG. 5 is in the fourth state.
Figure 9:
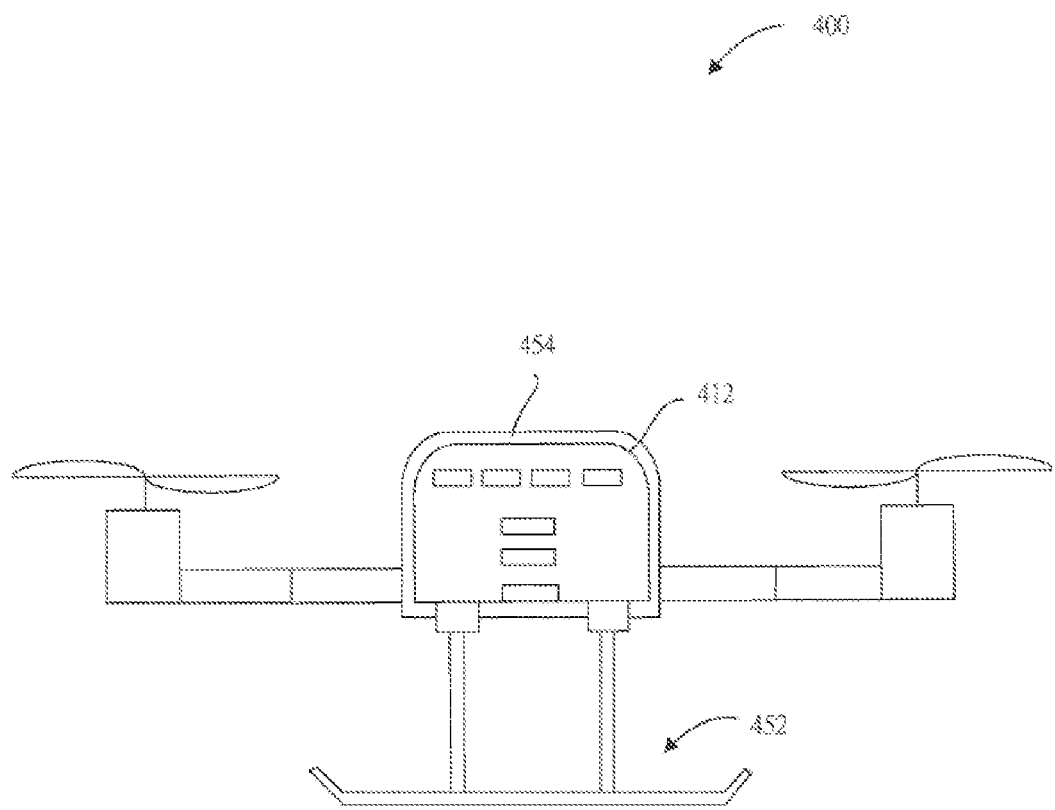
FIG. 9 is a schematic view illustrating that an unmanned aerial vehicle is in the first state according to a third implementation mode of the present disclosure.
Figure 10:
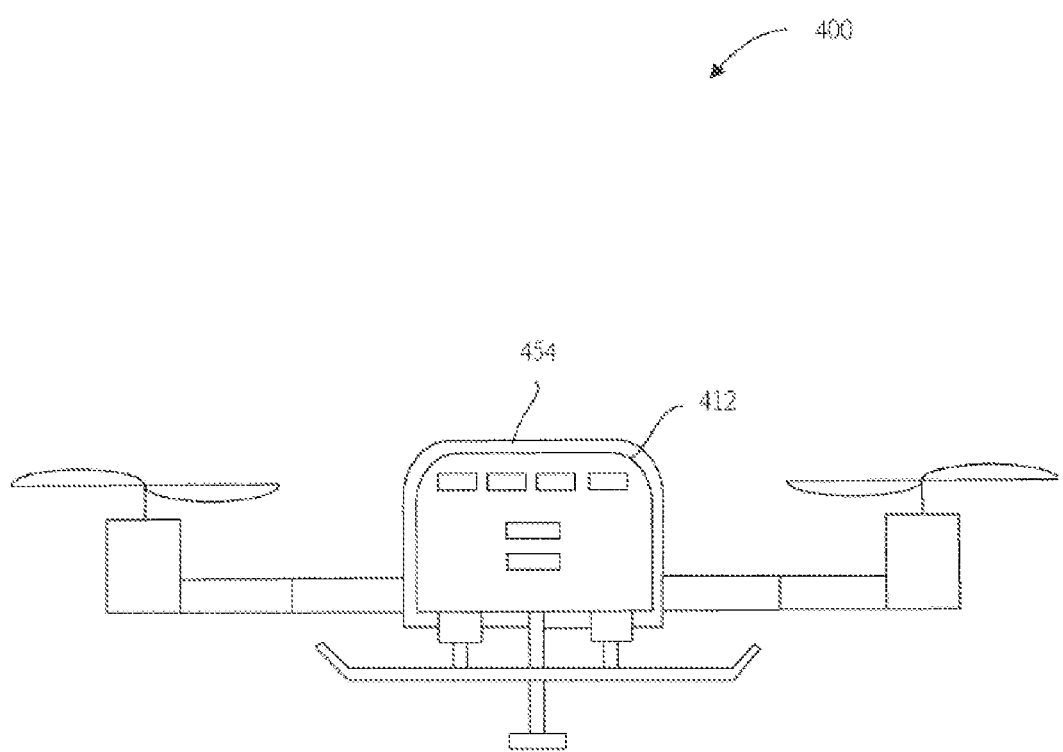
FIG. 10 is a schematic view illustrating that the unmanned aerial vehicle shown in FIG. 9 is in the second state.
Figure 11:
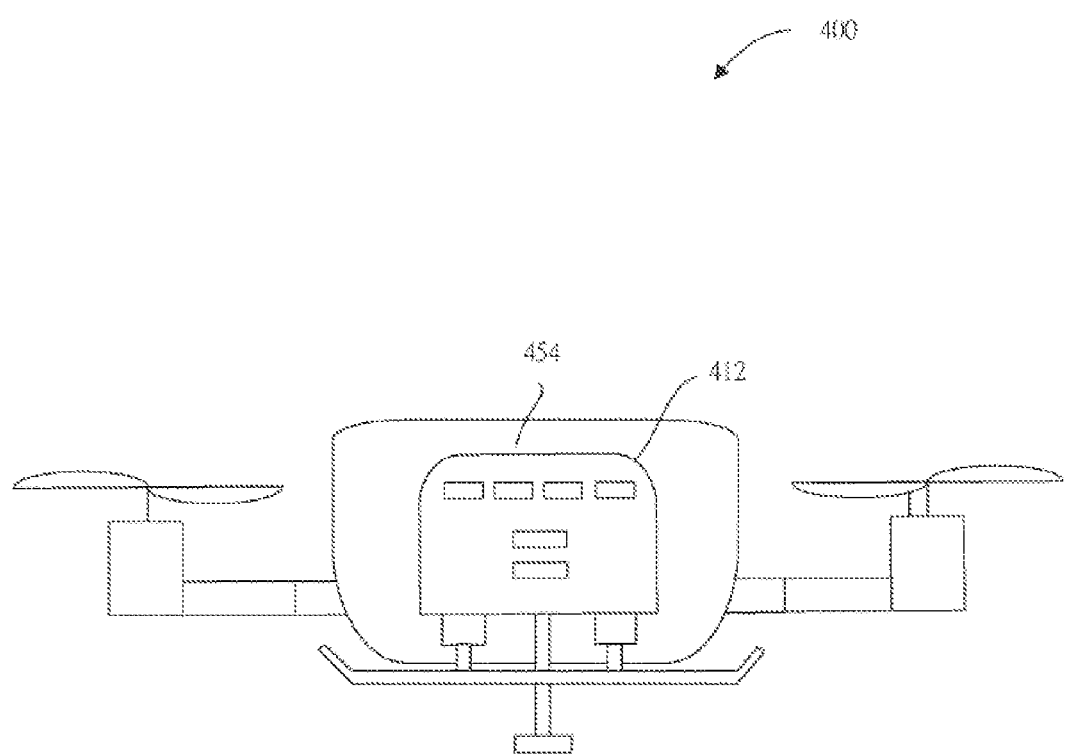
FIG. 11 is a schematic view illustrating that the unmanned aerial vehicle shown in FIG. 9 is in the third state.
Figure 12:
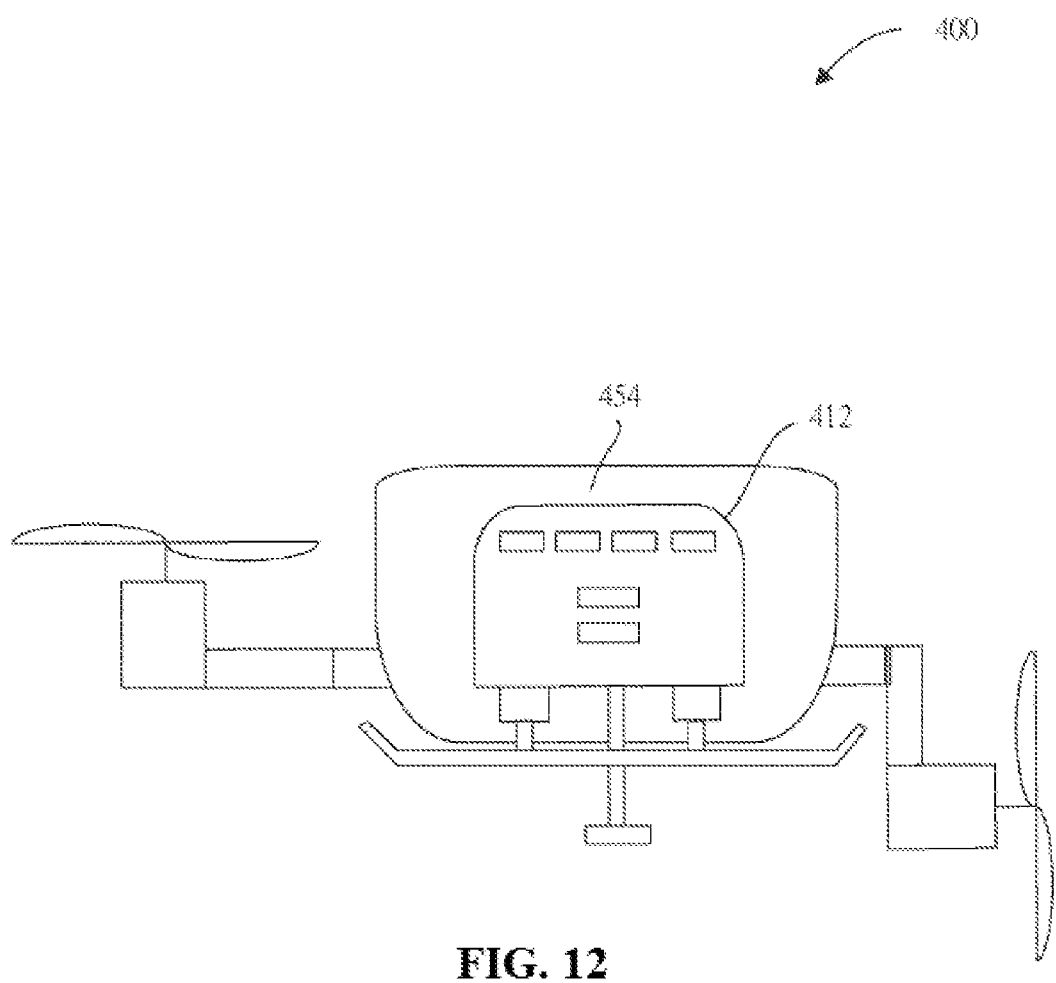
FIG. 12 is a schematic view illustrating that the unmanned aerial vehicle shown in FIG. 9 is in the fourth state.

| | |
|---|---|
| Unmanned aerial vehicle | 100, 200, 400 |
| Fuselage | 10 |
| Vehicle body | 12 |
| Vehicle arm | 14 |
| Power device | 30 |
| Rotor assembly | 32 |
| Mounting member | 321 |
| Driving member | 323 |
| Propeller | 325 |
| Propulsion assembly | 34 |
| Connecting mechanism | 341 |
| Thruster | 343 |
| Takeoff and landing device | 50 |
| Landing gear | 52, 252 |
| Supporting mechanism | 521 |
| Buffer mechanism | 523 |
| Suspension device | 54, 254, 454 |

TABLE 1-continued

| | |
|---|---|
| Bottom plate | 541, 2541 |
| Side plate | 543, 2543 |
| Control device | 70 |
| Main controller | 72 |
| Locating assembly | 73 |
| Landing surface detection assembly | 74 |
| Image collector | 741 |
| Image sensor | 743 |
| Distance sensor | 745 |
| Depth detector | 747 |
| Alarm | 749 |
| Unmanned aerial vehicle control system | S1 |
| Central control module | 101 |
| Takeoff control module | 103 |
| Travel control module | 105 |
| Environment detection module | 107 |
| Landing control module | 109 |
| On-water landing control unit | 1091 |
| Land landing control unit | 1092 |

Embodiments of the present disclosure will be further described in the following DETAILED DESCRIPTION OF THE EMBODIMENTS section in combination with the accompanying drawings.

DETAILED DESCRIPTION OF THE EMBODIMENTS

The technical solution in embodiments of the present disclosure is described in detail below with reference to the accompanying drawings in the embodiments of the present disclosure. It is apparent that the embodiments described are merely some embodiments of the present disclosure instead of all the embodiments. Based on the described embodiments in the present disclosure, all other embodiments obtained by persons of ordinary skill in the art without creative efforts all belong to the scope of the present disclosure.

It should be noted that, when one component is referred to as "fixed to" another component, it may be directly on another component or it is also possible that there is a third component between them. When one component is considered to "connect" another component, it may be directly connected to the other component or it is possible that there is a third component between them. When one component is considered to be "disposed on" another component, it may be directly disposed on the other component or it is possible that there is a third component between them. The terms "perpendicular," "horizontal," "left," "right," and similar expressions used herein are merely intended for description.

Unless otherwise defined, all the technical and scientific terms used herein have the same meanings generally understood by persons skilled in the technical field of the present disclosure. Herein, the terms used in the specification of the present disclosure are intended to describe specific embodiments, instead of limiting the present disclosure. The term "and/or" used herein includes any combination and all combinations of one or more related items listed.

Some implementation modes of the present disclosure are described below in detail in combination with the accompanying drawings. Without conflict, the following embodiments and features in the embodiments can be combined with each other.

An unmanned aerial vehicle includes a fuselage, a power device connected onto the fuselage, and a control device disposed on the fuselage and electrically connected with the power device. The control device is used for controlling the power device to switch an operating mode. It enables the unmanned aerial vehicle to fly in the air or navigate on a water surface.

An unmanned aerial vehicle control system operates on an unmanned aerial vehicle including a control device and a power device. The control device is used for controlling the power device to operate to provide power for travel of the unmanned aerial vehicle. The unmanned aerial vehicle control system includes: a central control module configured to receive a control instruction of takeoff, travel or landing of the unmanned aerial vehicle, and configured to allow the control device to control the power device to switch an operating mode. It enables the unmanned aerial vehicle to fly in the air or navigate on a water surface.

An unmanned aerial vehicle control method is applicable to an unmanned aerial vehicle. The unmanned aerial vehicle may include a control device and a power device. The control device is used for controlling the power device to operate to provide power for travel of the unmanned aerial vehicle. The unmanned aerial vehicle control method includes: receiving an unmanned aerial vehicle control instruction; and controlling the power device to switch an operating mode according to the control instruction. It enables the unmanned aerial vehicle to fly in the air or navigate on a water surface.

Referring to FIG. 1 to FIG. 4, in a first implementation mode of the present disclosure, an unmanned aerial vehicle 100 is provided, which is an amphibian unmanned aerial vehicle. The unmanned aerial vehicle 100 may be used in aerial flight and hovering. It may also be used in on-water navigation and residing. In some embodiments, the unmanned aerial vehicle 100 may take off or land on land. Also, the unmanned aerial vehicle 100 may take off or land on a water surface.

The unmanned aerial vehicle 100 includes a fuselage 10 and a power device 30, a takeoff and landing device 50, and a control device 70 which are disposed on the fuselage 10. The power device 30 and the takeoff and landing device 50 are electrically connected with the control device 70 respectively. The power device 30 is used for providing travel power for the unmanned aerial vehicle 100. The takeoff and landing device 50 is used for serving as a support when the unmanned aerial vehicle 100 lands. The control device 70 is used for controlling the unmanned aerial vehicle 100 to execute instructions such as fly, navigate, take off, or land.

The fuselage 10 includes a vehicle body 12 and a vehicle arm 14 disposed on the vehicle body 12. The vehicle body 12 is used for mounting the control device 70. One end of the vehicle arm 14 is disposed on the vehicle body 12. The other end extends towards a direction away from the vehicle body 12. In this implementation mode, there are a plurality of vehicle arms 14 which are circularly disposed around the vehicle body 12 and are disposed at intervals. The vehicle arms 14 are used for mounting part of the structure of the power device 30. It can be understood that the number of the vehicle arms 14 may be two, three, four, five, six, seven, eight, and so on.

The power device 30 includes a rotor assembly 32 and a propulsion assembly 34. Specifically, in the illustrated embodiment, the rotor assembly 32 is disposed on the vehicle arm 14 while the propulsion assembly 34 is disposed on the vehicle body 12.

In this implementation mode, there are a plurality of rotor assemblies 32 of which the number is the same as that of the vehicle arms 14. Each of the rotor assemblies 32 is mounted on one of the vehicle arms 14.

Each of the rotor assemblies 32 includes a mounting member 321, a driving member 323, and a propeller 325. Specifically, in the illustrated embodiment, the mounting member 321 is connected to the end of the vehicle arm 14. The driving member 323 is disposed on the mounting member 321. And, the propeller 325 is connected onto the driving member 323.

The mounting member 321 is rotatably connected to one end of the corresponding vehicle arm 14 away from the vehicle body 12, and is disposed in a manner of extending towards a direction away from the vehicle arm 14. The mounting member 321 can rotate a predetermined angle relative to the vehicle arm 14 under the control of the control device 70. Specifically, the mounting member 321 can, under the control of the control device 70, rotate a predetermined angle in a vertical plane around a joint between the mounting member 321 and the vehicle arm 14.

In this implementation mode, the driving member 323 is a motor. In some embodiments, the driving member 323 is a brushless motor. The driving member 323 is disposed on one end of the mounting member 321 away from the vehicle arm 14. It can be understood that, in other embodiments, the driving member 323 may also be a brush motor or other types of motors.

The propeller 325 is connected onto the driving member 323, and can rotate under the driving of the driving member 323. Specifically, a rotary shaft of the propeller 325 is substantially perpendicular to the mounting member 321.

When a direction along the length of the mounting member 321 is disposed along an extending direction of the vehicle arm 14, the rotary shaft of the propeller 325 is substantially perpendicular to the vehicle arm 14. At this point, the rotor assembly 32 can provide power for aerial flight or hovering of the unmanned aerial vehicle 100, and can also provide travel power for navigation of the unmanned aerial vehicle 100 on the water surface.

It can be understood that, as stated above, the mounting member 321 can rotate a predetermined angle in a vertical plane around a joint between the mounting member 321 and the vehicle arm 14 under the control of the control device 70. Accordingly, the rotary shaft of the propeller 325 may also be at a certain inclination angle to the vehicle arm 14.

When the mounting member 321 rotates relative to the vehicle arm 14, the mounting member 321 can drive the driving member 323 and the propeller 325 to rotate. At the same time, the rotary shaft of the propeller 325 also rotates therewith (please refer to FIG. 4). At this point, the rotor assembly 32 can provide travel power for navigation of the unmanned aerial vehicle 100 on the water surface. Specifically, when the unmanned aerial vehicle 100 lands on a water surface and when the mounting member 321 substantially rotates 90 degrees relative to the vehicle arm 14, the rotor assembly 32 can be partially or totally submerged in water. The driving member 323 drives the propeller 325 to rotate to provide travel power for navigation of the unmanned aerial vehicle 100 on the water surface.

In some embodiments, when the unmanned aerial vehicle 100 navigates on the water surface, the maximum rotation speed of the propeller 325 can be less than the minimum rotation speed that enables the unmanned aerial vehicle 100 to take off. It prevents the unmanned aerial vehicle 100 from taking off in the process of navigating on the water surface.

It can be understood that the mounting member 321 may not be limited to rotation in a vertical plane. It may also rotate on a horizontal plane, and/or rotate in a three-dimensional space to drive the driving member 323 and the propeller 325 to rotate on the horizontal plane and/or in the three-dimensional space. Accordingly, it provides power for navigation of the unmanned aerial vehicle 100 in various directions on the water surface.

It can be understood that all of the plurality of rotor assemblies 32 can rotate relative to the vehicle arms 14 to be partially or totally submerged in water in order to provide navigation power for the unmanned aerial vehicle 100. It is also possible that only some of the plurality of rotor assemblies 32 rotate relative to the vehicle arms 14 to be partially or totally submerged in water to provide navigation power for the unmanned aerial vehicle 100. The rest of the rotor assemblies 32 continuously operate on the water surface to provide lifting buoyancy for the unmanned aerial vehicle 100. It can ensure stability of navigation of the unmanned aerial vehicle 100 on the water surface. It is also possible that all or some of the plurality of rotor assemblies 32 can rotate a predetermined angle relative to the vehicle arm 14 and are located above the water surface to make rotation axes of the propellers 325 of the rotor assemblies 32 substantially parallel to the water surface. When the propellers 325 of the rotor assemblies 32 rotate, the unmanned aerial vehicle 100 can be driven to navigate on the water surface through a reaction thrust of the air. When the propellers 325 of the rotor assemblies 32 are located above the water surface, the rotation axes of the propellers 325 are not limited to a setting manner of being parallel to the water surface. For example, the rotation axes of the propellers 325 may also be disposed obliquely relative to the water surface. And, rotation axes of some of the plurality of propellers 325 may be different from each other to adjust travel speed and direction of the unmanned aerial vehicle 100 by means of air reaction thrusts in different directions.

The propulsion assembly 34 is disposed on the vehicle body 12, which is used for providing travel power for navigation of the unmanned aerial vehicle 100 on the water surface. The propulsion assembly 34 includes a connecting mechanism 341 (please refer to FIG. 2) and a thruster 343 disposed on the connecting mechanism 341.

The connecting mechanism 341 is a telescopic connecting mechanism, of which one end is disposed on the vehicle body 12 and the other end is used for mounting the thruster 343. The thruster 343 can relatively keep away from or get close to the vehicle body 12 under the driving of the connecting mechanism 341. In this implementation mode, the thruster 343 is an underwater thruster, which can drive the unmanned aerial vehicle 100 to accomplish operations such as advance, back, or turn on the water surface. Specifically, the thruster 343 may be a pump jet thruster, a propeller thruster, a spherical motor thruster, or other underwater thrusters.

When the unmanned aerial vehicle 100 does not need to operate on the water surface, the connecting mechanism 341 is in a folded state. And, the thruster 343 relatively gets close to the vehicle body 12 or is received in the vehicle body 12 to reduce the volume of the unmanned aerial vehicle 100 during a flying operation. It could improve flexibility of the control over flight of the unmanned aerial vehicle 100.

When the unmanned aerial vehicle 100 needs to navigate or reside on the water surface, the connecting mechanism 341 can be in an unfolded state to enable the thruster 343 to adjust a distance between it and the vehicle body 12 as required. For example, the connecting mechanism 341 can drive the thruster 343 to a position away from the vehicle body 12 until the thruster 343 protrudes beyond one side of the takeoff and landing device 50 away from the vehicle body 12. It could ensure that, when the unmanned aerial vehicle 100 lands on the water surface through the takeoff and landing device 50, the thruster 343 can be submerged in water to provide travel power for navigation of the unmanned aerial vehicle 100 on the water surface. It can be understood that the connecting mechanism 341 can drive the thruster 343 to a position between the vehicle body 12 and the takeoff and landing device 50.

In some embodiments, the connecting mechanism 341 is electrically connected with the control device 70, and can be unfolded or folded under the control of the control device 70.

It can be understood that, in other embodiments, the propulsion assembly 34 may also be omitted. When the unmanned aerial vehicle 100 needs to navigate or reside on the water surface, power is provided directly through rotation of the propeller 325 of the rotor assembly 32.

The takeoff and landing device 50 is disposed on the vehicle body 12, which is used for providing a support for landing of the unmanned aerial vehicle 100 on land or the water surface. The takeoff and landing device 50 includes a landing gear 52 and a suspension device 54. Specifically, in the illustrated embodiment, the landing gear 52 is connected onto the vehicle body 12, and the suspension device 54 is disposed on the landing gear 52.

The landing gear 52 includes a supporting mechanism 521 and a buffer mechanism 523 disposed on the supporting mechanism 521. One end of the supporting mechanism 521 is disposed on the vehicle body 12 while the other end extends towards a direction away from the vehicle body 12. In this implementation mode, the supporting mechanism 521 is a telescopic supporting mechanism. The buffer mechanism 523 is disposed on one end of the supporting mechanism 521 away from the vehicle body 12. The buffer mechanism 523 can relatively keep away from or get close to the vehicle body 12 under the driving of the supporting mechanism 521. In this implementation mode, the buffer mechanism 523 can be elastically deformed by an external force. It may reduce an impact on the unmanned aerial vehicle 100 when the unmanned aerial vehicle 100 lands on a hard surface. In some embodiments, the buffer mechanism 523 may be a buffer member made of an elastic material such as plastic, rubber or foam. In other embodiments, the buffer mechanism 523 may be a buffer damper such as a pneumatic damper, a hydraulic damper, or a spring damper.

In other embodiments, the supporting mechanism 521 may also be a non-telescopic supporting mechanism, which is directly fixed onto the vehicle body 12.

When the unmanned aerial vehicle 100 does not need to land on the land, the supporting mechanism 521 is in a folded state. The buffer mechanism 523 gets close to the vehicle body 12 or is received in the vehicle body 12 to reduce the volume of the unmanned aerial vehicle 100 during operation and improve flexibility of the control over travel of the unmanned aerial vehicle 100. When the unmanned aerial vehicle 100 needs to land on the land, the supporting mechanism 521 can be in an unfolded state. In addition, the buffer mechanism 523 relatively keeps away from the vehicle body 12 and serves as a support when the unmanned aerial vehicle 100 lands.

In this implementation mode, the suspension device 54 is substantially plate-like, which is disposed on one side of the buffer mechanism 523 away from the vehicle body 12. The density of the suspension device 54 is far less than that of the water. When the unmanned aerial vehicle 100 needs to operate on water, the suspension device 54 can float on the water or be partially/totally submerged in the water and support the entire unmanned aerial vehicle 100. It may enable the entire unmanned aerial vehicle 100 to navigate or reside on the water surface under the driving of the power device 30.

In this implementation mode, the suspension device 54 is an inflatable buoyancy plate. When the unmanned aerial vehicle 100 does not need to operate on the water surface, the suspension device 54 is in a compressed state and substantially flat, and is superimposed on one side of the buffer mechanism 523 away from the vehicle body 12. When the unmanned aerial vehicle 100 needs to operate on the water surface, the suspension device 54 is filled with gas and expands (please refer to FIG. 3 and FIG. 4) to support the entire unmanned aerial vehicle 100 when the suspension device 54 floats on the water or when it partially/totally submerged in the water.

In some embodiments, the suspension device 54 may include a bottom plate 541 and a side plate 543 disposed on a peripheral edge of the bottom plate 541. The bottom plate 541 is substantially in a shape of a horizontally disposed plate while the side plate 543 is disposed on an edge of the bottom plate 541. The side plate 543 is inclined relative to the bottom plate 541, and is disposed in a manner of extending towards a direction of the fuselage 10. A predetermined angle is formed between the bottom plate 543 and the side plate 541. It may enable the unmanned aerial vehicle 100 to cut its way through the waves when navigating on the water surface and relatively reducing resistance of its travel in the water. Specifically, the bottom plate 541 may be a circular plate, a rectangular plate, a triangular plate, a polygonal plate, or plates in any other shapes. The side plate 543 may be in a shape of a ring adapted to a contour shape of the bottom plate 541 and circularly disposed on the peripheral edge of the bottom plate 541. It may enable the unmanned aerial vehicle 100 to reduce resistance of travel when navigating towards various directions on the water surface. The bottom plate 541 may also be sheet-like. There are a plurality of bottom plates 541 which can be disposed at intervals on a peripheral edge of the bottom plate 541.

In some embodiments, a mounting angle of the side plate 543 relative to the bottom late 541 is adjustable to adapt to the water surface in different states. For example, when the water surface fluctuates greatly, the control device 70 can control the side plate 543 to move relative to the bottom plate 541. It may result in a relatively greater angle formed by the side plate 543 relative to the bottom plate 541. On the contrary, when the water surface fluctuates less, the control device 70 can control the side plate 543 to move relative to the bottom plate 541. It may result in a relatively smaller angle formed by the side plate 543 relative to the bottom plate 541.

In addition, a mounting angle of the bottom plate 541 relative to the vehicle body 12 is adjustable to facilitate the unmanned aerial vehicle 100 to land on the water surface in different flight attitudes, and also facilitate the unmanned aerial vehicle 100 to be capable of adapting to the water surface in different states when landing. For example, when the unmanned aerial vehicle 100 flies obliquely, the vehicle body 12 tilts relative to the horizontal plane. If, at this point, the unmanned aerial vehicle 100 needs to land onto the water surface, the control device 70 can control the bottom plate 541 to move relative to the vehicle body 12 and adjust an angle at which the bottom plate 541 enters into the water. It could enable the bottom plate 541 to be substantially parallel to the horizontal plane to ensure that the bottom plate 541 can provide greater buoyancy support for the entire unmanned aerial vehicle 100. When the unmanned aerial vehicle 100 flies at a higher speed and needs to land onto the water surface, the control device 70 can control the bottom plate 541 to move to be obliquely disposed relative to the water surface. One side of the bottom plate 541 away from the vehicle body 12 faces a travel direction of the unmanned aerial vehicle 100 to facilitate the unmanned aerial vehicle 100 to land on the water surface. Similarly, when the water surface fluctuates greatly, the control device 70 can control the bottom plate 541 to move relative to the vehicle body 12. It may result in that the bottom plate 541 is obliquely disposed relative to the water surface, which reduce influences of fluctuation of the water surface on landing of the unmanned aerial vehicle 100.

It can be understood that, in other implementation modes, the suspension device 54 may be a solid buoyancy plate, which may be made of a lower-density material, such as a solid buoyancy material. It can be understood that, when the suspension device 54 is a solid buoyancy plate, it may also be used as the buffer mechanism 523 of the landing gear 52. At this point, the buffer mechanism 523 may be omitted, but the suspension device 54 is directly disposed on the supporting mechanism 521.

The control device 70 is disposed on the fuselage 10, which includes a main controller 72 and a locating assembly 73 and a landing surface detection assembly 74 electrically connected with the main controller 72.

The main controller 72 is further electrically connected with the power device 30 and the takeoff and landing device 50. The main controller 72 is used for controlling the power device 30 and the takeoff and landing device 50 to move.

The locating assembly 73 is used for determining orientation information of the unmanned aerial vehicle 100 in real time, which includes a magnetic field sensor (not shown) and a satellite positioner (not shown). In this implementation mode, the magnetic field sensor is a compass, and the satellite positioner is a GPS positioning unit. The magnetic field sensor is used for determining a travel direction of the unmanned aerial vehicle 100. The satellite positioner is used for determining orientation of the unmanned aerial vehicle 100 in real time. When the unmanned aerial vehicle 100 executes a landing control instruction, it can locate itself through the locating assembly 73 to determine a geographic location and an environment condition of the unmanned aerial vehicle 100. It may cause the unmanned aerial vehicle 100 to enter into a landing pre-determination state in advance to allow the landing surface detection assembly 74 to enter into a detection state, which improves sensitivity of the control over the unmanned aerial vehicle 100. The geographic location is real-time orientation of the unmanned aerial vehicle 100, such as a mountain surface, a residential building, a lake, or a sea surface.

The landing surface detection assembly 74 is used for detecting a condition of a landing destination of the unmanned aerial vehicle 100 to determine whether the landing destination is a water surface or a non-water surface. The landing surface detection assembly 74 may be also used for returning a determination result to the main controller 72 to enable the main controller 72 to control the power device 30 and the takeoff and landing device 50 to switch to an operating state adapted to the landing destination.

In this implementation mode, the landing surface detection assembly 74 includes an image collector 741, an image sensor 743, a distance sensor 745 and a depth detector 747.

In this implementation mode, the image collector 741 includes a camera (not shown) and an image analysis element (not shown). The camera is used for acquiring an object surface image of the landing destination of the unmanned aerial vehicle 100, and transmitting the image into the image analysis element. The image analysis element identifies an object type in the image by analyzing object surface texture features of the landing destination. Specifically, the image analysis element is pre-set therein with ripple features of a liquid surface. The image analysis element, after acquiring an object surface image of the landing destination, scans and analyzes the surface image, extracts surface texture features of the surface image, compares the surface texture features with the ripple features of the liquid surface, and determines whether the landing destination is a liquid surface such as a water surface.

In some implementation modes, the image collector 741 may include a camera (not shown) and an image processing element (not shown). The camera is used for acquiring an object surface image of a landing destination of the unmanned aerial vehicle 100, and transmitting the image into the image processing element. The image processing element identifies an object type in the image according to differences between different spectrum features of different objects. Specifically, the image processing element is pre-set therein with simulated spectrum features of objects such as water, vegetation, soil and cement ground. The image processing element, after acquiring the object surface image of the landing destination, for an object presented by the image, constructs and calculates reflectivity of the object, to acquire spectrum features of the object in the image. Then, the image processing element compares the acquired spectrum features with the pre-set simulated spectrum features to determine the type of the object presented in the image. It can be understood that the image processing element may be an imaging spectrometer.

In some implementation modes, the image collector 741 may include a plurality of cameras (not shown) and a plurality of polarizers (not shown) each of which is disposed on one of the cameras. Structures, parameters, and configuration of the plurality of cameras are the same. The cameras are used for acquiring object surface image information of a landing destination of the unmanned aerial vehicle 100. Each of the polarizers is disposed on the corresponding camera, and covers a viewing lens of the camera. Polarizing angles of the plurality of polarizers are different from each other. When the unmanned aerial vehicle 100 is to land, directed and/or reflected light of an object on the landing destination may be projected into the viewing lens of the camera through the polarizer. Under normal circumstances, light directed and/or reflected by solid objects such as vegetation, soil, and cement ground is more stable. Polarized light, the light through the plurality of polarizers, is also more stable. Light reflected by a liquid surface such as water may fluctuate due to the presence of ripples of the liquid surface. Polarized light, the light reflected by the liquid surface through the plurality of polarizers, may have a jitter difference. Accordingly, the image collector 741 determines the type of the object on the landing destination. It can be understood that the number of the cameras and the polarizers may be two or more, for example, two, three, four, five, six, and so on.

It can be understood that, when a user of the unmanned aerial vehicle 100 controls the unmanned aerial vehicle 100 to land on the water surface, the landing surface detection assembly 74 and/or the detection process may be omitted. In addition, the process of landing to the water surface by the unmanned aerial vehicle 100 may be as follows: after receiving a control instruction of landing on the water surface, the main controller 72 can control the power device 30 and the takeoff and landing device 50 to switch to an on-water landing mode.

The image sensor 743 is used for returning the image information collected by the image collector 741 and the determination result of the object type to the main controller 72. It may allow the main controller 72 to control the power device 30 and the takeoff and landing device 50 to switch to an operating state adapted to the object type of the landing destination.

It can be understood that the image sensor 743 may also be omitted. The image information collected by the image collector 741 and the determination result of the object type are directly transmitted into the main controller 72. Alternatively, the image sensor 743 is integrated with the image collector 741.

The distance sensor 745 is used for detecting a distance between the unmanned aerial vehicle 100 and the object surface of the landing destination. It may cause the main controller 72 to control the power device 30 and the takeoff and landing device 50 to be ready for switching to the operating state adapted to the object type of the landing destination. The distance sensor 745 may be a barometer, an ultrasonic range-finding sensor, a laser range-finding sensor, or the like. When the distance between the unmanned aerial vehicle 100 and the landing destination detected by the distance sensor 745 is within a pre-set range, the main controller 72 controls the power device 30 and the takeoff and landing device 50 to be ready for switching to the operating state adapted to the object type of the landing destination.

Specifically, if the landing destination of the unmanned aerial vehicle 100 is a non-water surface, the main controller 72 controls the supporting mechanism 521 to drive the buffer mechanism 523 to keep away from the vehicle body 12 when the distance between the unmanned aerial vehicle 100 and the landing destination detected by the distance sensor 745 is within a pre-set range. It may serve as a support when the unmanned aerial vehicle 100 lands.

If the landing destination of the unmanned aerial vehicle 100 is a water surface, the main controller 72 controls the connecting mechanism 341 to drive the thruster 343 to keep away from the vehicle body 12 and controls the suspension device 54 to be filled with gas on its own when the distance between the unmanned aerial vehicle 100 and the landing destination detected by the distance sensor 745 is within a pre-set range. It may help get ready for landing of the unmanned aerial vehicle 100 on the water surface.

After the distance sensor 745 detects that the unmanned aerial vehicle 100 lands on the water surface, the main controller 72 may, according to operational requirements, control the mounting member 321 of the rotor assembly 32 to rotate a predetermined angle relative to the vehicle arm 14. The rotor assembly 32 can be partially or totally submerged in the water while the driving member 323 drives the propeller 325 to rotate. It may provide travel power for navigation of the unmanned aerial vehicle 100 on the water surface. It can be understood that all of the plurality of rotor assemblies 32 can rotate relative to the vehicle arms 14 to be partially or totally submerged in the water to provide navigation power for the unmanned aerial vehicle 100. It is also possible that only some of the plurality of rotor assemblies 32 rotate relative to the vehicle arms 14 to be partially or totally submerged in the water to provide navigation power for the unmanned aerial vehicle 100. The rest of the rotor assemblies 32 continuously operate on the water surface to provide lifting buoyancy for the unmanned aerial vehicle 100. It may ensure stability of navigation of the unmanned aerial vehicle 100 on the water surface. It is also possible that all or some of the plurality of rotor assemblies 32 can rotate a predetermined angle relative to the vehicle arm 14 and are located above the water surface. It may make rotation axes of the propellers 325 of the rotor assemblies 32 substantially parallel to the water surface. When the propellers 325 of the rotor assemblies 32 rotate, the unmanned aerial vehicle 100 can be driven to navigate on the water surface through a reaction thrust of the air. It can be understood that the rotation axes of the propellers 325 of the rotor assemblies 32 may also be disposed obliquely relative to the water surface.

The depth detector 747 is used for detecting the water depth of the landing destination when the landing destination of the unmanned aerial vehicle 100 is the water surface. Specifically, the depth detector 747 is a water depth detecting instrument. If the depth detector 747 detects that the water depth of the landing destination falls within a preset depth range, the landing destination is determined as a shallow water area and is not suitable for the unmanned aerial vehicle 100 to land in a manner of water surface operation in order to avoid damage such as impacts caused by landing of the unmanned aerial vehicle in a shallow water surface (e.g., a water accumulated area on road).

In other embodiments, the unmanned aerial vehicle 100 may also include an alarm 749 which is used for sending a warning signal after the depth detector 747 determines that the landing destination is a shallow water area, and enabling the user of the unmanned aerial vehicle 100 to re-adjust the landing destination of the unmanned aerial vehicle 100 after receiving the warning signal. The alarm 749 may give an alarm through sound and light. For example, the alarm 749 is an alarm device such as a warning light or a buzzer. It can be understood that the alarm 749 may also give an alarm through information. For example, after the depth detector 747 determines that the landing destination is a shallow water area, the alarm 749 transmits a warning signal (e.g., text information, picture/icon information, screen blinking and so on) to a mobile terminal (e.g., a remote controller, a portable electronic device and so on) of the user of the unmanned aerial vehicle 100. It may enable the user of the unmanned aerial vehicle 100 to understand that the current landing destination is not suitable for the unmanned aerial vehicle 100 to land and that the landing destination of the unmanned aerial vehicle 100 should be re-adjusted.

Referring to FIG. 5 to FIG. 8 at the same time, FIG. 5 to FIG. 8 illustrate an unmanned aerial vehicle 200 according to a second implementation mode of the present disclosure. The structure of the unmanned aerial vehicle 200 according to the second implementation mode is substantially the same as that of the unmanned aerial vehicle 100 according to the first implementation mode. The difference lies in that the suspension device 254 of the unmanned aerial vehicle 200 is disposed on the vehicle body 212 and located on one side of the vehicle body 212 close to the landing gear 252. It may make the unmanned aerial vehicle 200 relatively low in terms of the overall center of gravity during on-water operation and not easy to overturn. In common with the unmanned aerial vehicle 100 according to the first implementation mode, the suspension device 254 of the unmanned aerial vehicle 200 according to the second implementation mode may be a buoyancy plate made of a solid buoyancy material and may be an inflatable buoyancy plate, which may further include a bottom plate 2541 and a side plate 2543 disposed on a peripheral edge of the bottom plate 2541. In other embodiments, the suspension device 254 may also be a buoyancy ring circularly disposed on the periphery of the vehicle body 12. In this embodiment, the unmanned aerial vehicle 200 may not be provided with a landing gear.

Referring to FIG. 9 to FIG. 12 at the same time, FIG. 9 to FIG. 12 illustrate an unmanned aerial vehicle 400 according to a third implementation mode of the present disclosure. The structure of the unmanned aerial vehicle 400 according to the third implementation mode is substantially the same as that of the unmanned aerial vehicle 100 according to the first implementation mode. The difference lies in that the suspension device 454 of the unmanned aerial vehicle 400 is disposed on the vehicle body 412 and coats the periphery of the vehicle body 412. It may make the unmanned aerial vehicle 400 relatively low in terms of the overall center of gravity during on-water operation and not easy to overturn. In this implementation mode, the suspension device 454 is an inflatable buoyancy ring, which is circularly disposed on the periphery of the vehicle body 412. When the unmanned aerial vehicle 400 needs to land on the water surface, the suspension device 454 can be inflated on its own and expand to get ready for supporting the landing of the unmanned aerial vehicle 400. It can be understood that the suspension device 454 may coat the overall structure of the vehicle body 412 therein and may also only coat part of the structure of the vehicle body 412 therein. It can be understood that the suspension device 454 may also be a buoyancy ring made of a solid buoyancy material. In this embodiment, the unmanned aerial vehicle 400 may not be provided with a landing gear.

Figure 13:
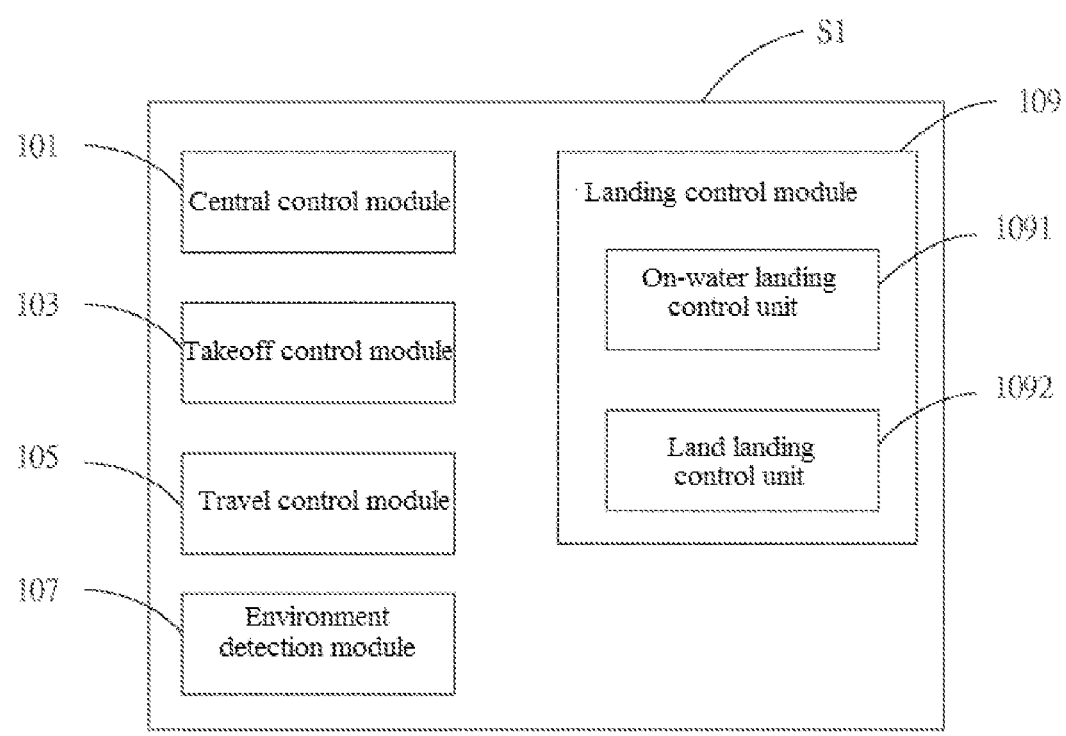
FIG. 13 is a functional module view of an unmanned aerial vehicle control system according to an implementation mode of the present disclosure.

Referring to FIG. 13, an unmanned aerial vehicle control system S1 is further provided in the present disclosure. FIG. 13 illustrates a functional module view of an unmanned aerial vehicle control system S1 according to an implementation mode of the present disclosure. The unmanned aerial vehicle control system S1 operates in the power device 30, the takeoff and landing device 50, or the control device 70 described above. Specifically, the unmanned aerial vehicle control system S1 includes a central control module 101, a takeoff control module 103, a travel control module 105, an environment detection module 107, and a landing control module 109. Further, the control device 70 further includes a memory (not shown), and each module of the unmanned aerial vehicle control system S1 is a programmable module that is stored in the memory and can be executed by the control device 70.

More details are described specifically as follows:

The central control module 101 is used for sending an instruction to each of the remaining modules in order to enable the modules to cooperate with each other to control the unmanned aerial vehicle 100, 200, or 400 to take off, travel, or land. Specifically, upon receipt of a control instruction of takeoff, travel, or land, the central control module 101 transmits the instruction to the takeoff control module 103, the travel control module 105, the environment detection module 107 or the landing control module 109 according to the different instruction.

The takeoff control module 103 is used for controlling the rotor assembly 32 of the power device 30 to operate to provide lifting force of takeoff for the unmanned aerial vehicle 100, 200 or 400. Specifically, when the unmanned aerial vehicle 100, 200 or 400 is in a stationary state and when the central control module 101 receives a takeoff control instruction, the takeoff control module 103 acquires the takeoff control instruction from the central control module 101, and controls the propeller 325 of the rotor assembly 32 to rotate at a predetermined speed and lift the unmanned aerial vehicle 100, 200 or 400.

The travel control module 105 is used for controlling the power device 30 to operate to enable the unmanned aerial vehicle 100, 200 or 400 to fly and hover in the air or navigate and reside on the water surface. Specifically, after the unmanned aerial vehicle 100, 200 or 400 takes off, the central control module 101 may receive a travel control instruction (e.g., accelerate, decelerate, forward, back, turn and so on). Then, the travel control module 105 acquires the travel control instruction from the central control module 101 and controls the propeller 325 of the rotor assembly 32 to rotate at a predetermined speed/acceleration to achieve aerial flight operations of the unmanned aerial vehicle 100, 200 or 400. Alternatively, after the unmanned aerial vehicle 100, 200 or 400 lands on the water, the central control module 101 receives a travel control instruction (e.g., accelerate, decelerate, forward, back, turn and so on). Then, the travel control module 105 acquires the travel control instruction from the central control module 101, and controls the thruster 343 of the propulsion assembly 34 to rotate at a predetermined speed/acceleration to achieve on-water navigation operations of the unmanned aerial vehicle 100, 200 or 400.

The environment detection module 107 is used for detecting an object type of the landing destination of the unmanned aerial vehicle 100, 200, or 400 to enable the takeoff and landing device 50 to switch to a land landing mode or an on-water landing mode according to different object types of the landing destination. Specifically, during the aerial flight process of the unmanned aerial vehicle 100, 200, or 400, the central control module 101 receives a landing control instruction. Then, the environment detection module 107 acquires the landing control instruction from the central control module 101, controls the landing surface detection assembly 74 to detect and determine the object type of the landing destination of the unmanned aerial vehicle 100, 200, or 400, and transmits a determination result to the landing control module 109 to allow the landing control module 109 to control the takeoff and landing device 50 to switch to the land landing mode or the on-water landing mode.

The landing control module 109 is used for controlling the takeoff and landing device 50 to switch to the land landing mode or the on-water landing mode. The landing control module 109 includes an on-water landing control unit 1091 and a land landing control unit 1092. The on-water landing control unit 1091 is used for controlling the suspension device 54, 254, or 454 to operate to get ready for on-water landing of the unmanned aerial vehicle 100, 200, or 400. The land landing control unit 1092 is used for controlling the landing gear 52, 252, or 452 to operate to get ready for landing of the unmanned aerial vehicle 100, 200, or 400 on a non-water surface destination.

Specifically, the landing control module 109 receives the object type of the landing destination of the unmanned aerial vehicle 100, 200, or 400 sent by the environment detection module 107, and controls the takeoff and landing device 50 to switch according to the object type. If the landing destination of the unmanned aerial vehicle 100, 200, or 400 is a water surface suitable for landing, the distance sensor 745 detects that the distance between the unmanned aerial vehicle 100, 200, or 400. In addition, the landing destination is with a pre-set range. Then, the on-water landing control unit 1091 controls the connecting mechanism 341 to drive the thruster 343 to keep away from the vehicle body 12, and controls the suspension device 54 to be filled with gas on its own to get ready for landing of the unmanned aerial vehicle 100 on the water surface. If the landing destination of the unmanned aerial vehicle 100, 200, or 400 is a non-water surface, the distance sensor 745 detects that the distance between the unmanned aerial vehicle 100, 200, or 400. In addition, the landing destination is with a pre-set range. Then, the land landing control unit 1092 controls the supporting mechanism 521 to drive the buffer mechanism 523 to keep away from the vehicle body 12 to serve as a support when the unmanned aerial vehicle 100 lands. Accordingly, the unmanned aerial vehicle 100, 200 or 400 can land smoothly.

Figure 14:
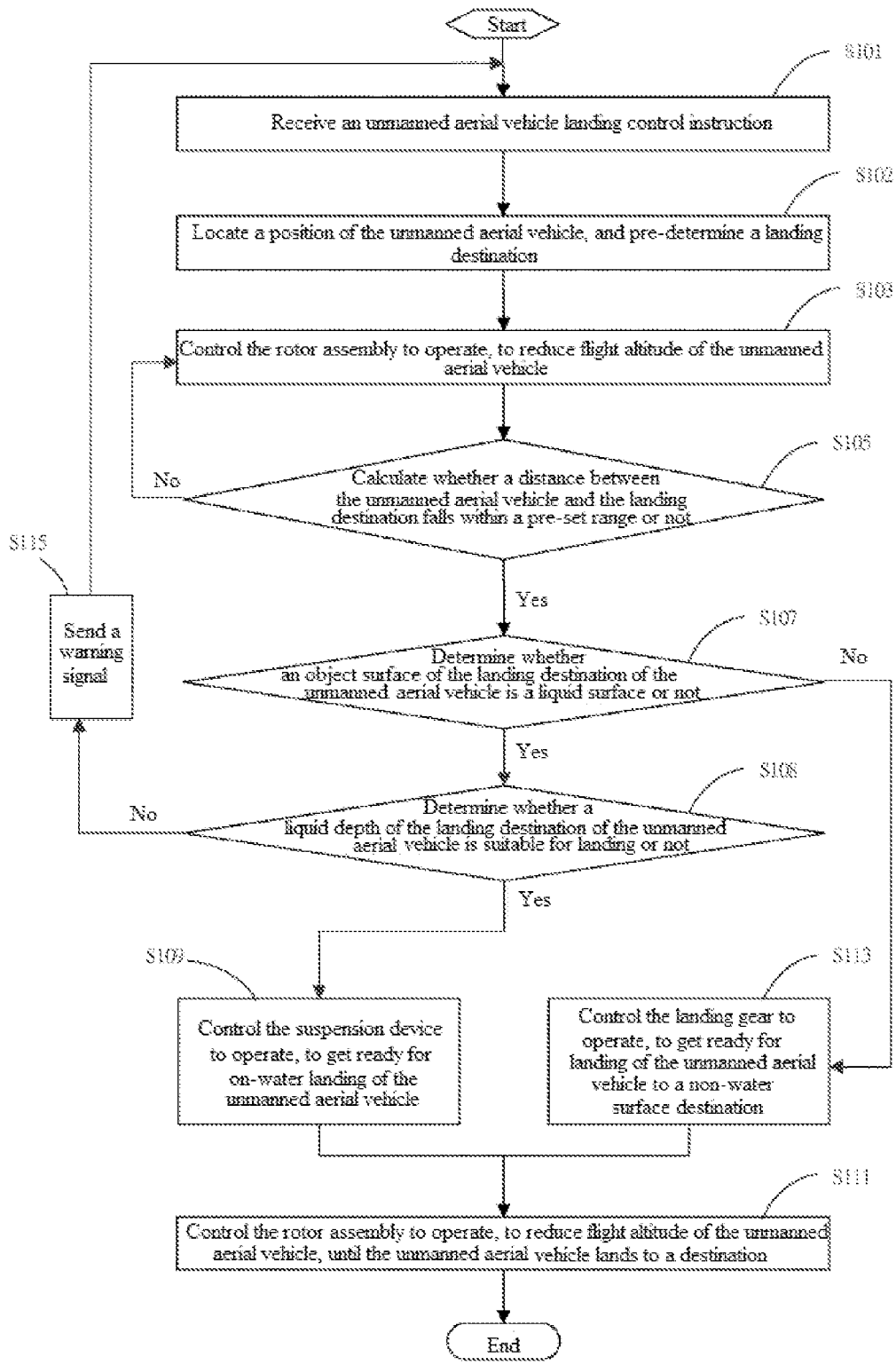
FIG. 14 is a schematic flow chart of an unmanned aerial vehicle landing control method according to an implementation mode of the present disclosure.

Referring to FIG. 14 at the same time, an unmanned aerial vehicle landing control method is further provided in the present disclosure. FIG. 14 illustrates a schematic flow chart of an unmanned aerial vehicle landing control method according to an implementation mode of the present disclosure. The unmanned aerial vehicle landing control method includes the following steps:

Step S101: receive an unmanned aerial vehicle landing control instruction. Specifically, when the unmanned aerial vehicle 100, 200, or 400 is in an aerial flight process, the central control module 101 receives the landing control instruction, and transmits the landing control instruction into the travel control module 105 and the environment detection module 107.

Step S102: position the unmanned aerial vehicle, and pre-determine a landing destination. Specifically, the environment detection module 107 controls the magnetic field sensor and the satellite positioner to determine real-time orientation of the unmanned aerial vehicle 100, 200, or 400, and pre-determines a geographic position and an environmental condition of the landing destination of the unmanned aerial vehicle 100, 200, or 400.

Step S103: control the power device 30 to operate to reduce flight altitude of the unmanned aerial vehicle. Specifically, the travel control module 105 controls the rotor assembly 32 of the power device 30 to rotate at a predetermined speed/acceleration after acquiring the landing control instruction from the central control module 101. It may drive the entire unmanned aerial vehicle to reduce the flight altitude.

Step S105: determine whether a distance between the unmanned aerial vehicle and the landing destination falls within a pre-set range. Specifically, the environment detection module 107 controls the distance sensor 745 of the landing surface detection assembly 74 to detect the distance between the unmanned aerial vehicle 100, 200, 400 and the landing destination. If the distance is determined as within a pre-set range, step S107 is performed. If that is not the case, step S103 is performed.

It can be understood that the distance sensor 745 may detect the distance between the unmanned aerial vehicle and the landing destination in real time, and may also detect the distance between the unmanned aerial vehicle and the landing destination at an interval. A time interval between two detections of the distance sensor 745 may be 1 s, 2 s, 3 s, and so on. It may also be 0.1 s, 0.2 s, 0.3 s, and so on. It even may be 1 ms, 2 ms, 3 ms, and so on.

Step S107: determine whether an object surface of the landing destination of the unmanned aerial vehicle is a liquid surface such as a water surface. Specifically, the environment detection module 107 acquires the landing control instruction from the central control module 101, controls the landing surface detection assembly 74 to detect and determine whether the object surface of the landing destination of the unmanned aerial vehicle 100, 200 or 400 is a liquid surface such as a water surface, and transmits a determination result into the landing control module 109. If the object surface of the landing destination is the liquid surface such as the water surface, step S108 is performed. If that is not the case, step S113 is performed.

It can be understood that, if the user of the unmanned aerial vehicle 100 controls the unmanned aerial vehicle 100 to land on the water surface as step S101, the determination process of step S107 may be omitted when the central control module 101 receives an on-water landing control instruction. And, step S108 is directly performed.

Step S108: determine whether the water depth of the landing destination is suitable for the unmanned aerial vehicle 100, 200 or 400 to land. Specifically, the environment detection module 107 controls the depth detector 747 to detect the water depth of the landing destination. If the water depth of the landing destination does not fall within a pre-set depth range, it is determined that the landing destination is a water surface suitable for the unmanned aerial vehicle 100, 200 or 400 to land. And, step S109 is performed. If the water depth of the landing destination falls within a pre-set depth range, it is determined that the landing destination is a shallow water area not suitable for the unmanned aerial vehicle 100, 200 or 400 to land. And, step S115 is performed.

Step S109: control the suspension device 54, 254 or 454 to operate to get ready for on-water landing of the unmanned aerial vehicle 100, 200 or 400. Specifically, the on-water landing control unit 1091 of the landing control module 109 controls the connecting mechanism 341 to drive the thruster 343 to keep away from the vehicle body 12, and controls the suspension device 54 to be filled with gas on its own to get ready for landing of the unmanned aerial vehicle 100 on the water surface.

Step S111: control the rotor assembly 32 to operate to reduce flight altitude of the unmanned aerial vehicle until the unmanned aerial vehicle lands to a destination. Specifically, the travel control module 105 controls the rotor assembly 32 of the power device 30 to rotate at a predetermined speed/acceleration to drive the entire unmanned aerial vehicle to reduce the flight altitude until the unmanned aerial vehicle lands to a destination.

Step S113: control the landing gear 52, 252 or 452 to operate to get ready for landing of the unmanned aerial vehicle 100, 200 or 400 on a non-water surface destination. Specifically, the land landing control unit 1092 of the landing control module 109 controls the supporting mechanism 521 to drive the buffer mechanism 523 to keep away from the vehicle body 12. It may serve as a support when the unmanned aerial vehicle 100 lands, the unmanned aerial vehicle 100, 200 or 400 can land smoothly, and step S111 is performed.

Step S115: control a warning signal is sent, the unmanned aerial vehicle 100, 200 or 400 not to execute a landing control instruction, and adjust the landing destination. Specifically, the central control module 101 controls the alarm 749 to send a warning signal indicating that landing is not suitable. The landing control module 109 stops controlling the takeoff and landing device 50. The travel control module 105 controls the unmanned aerial vehicle 100, 200 or 400 to continue the aerial operation. The central control module 101 waits for receiving a re-landing instruction from the user, and step S101 is performed.

Figure 15:
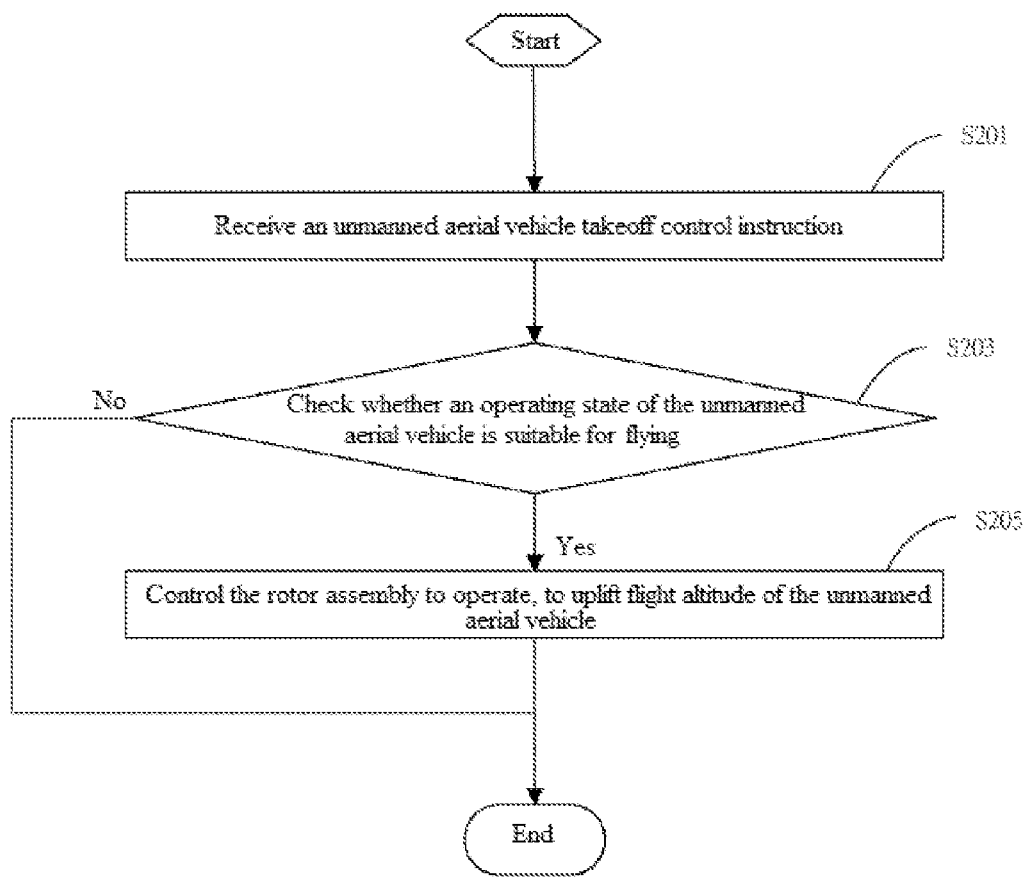
FIG. 15 is a schematic flow chart of an unmanned aerial vehicle takeoff control method according to an implementation mode of the present disclosure.
Figure 16:
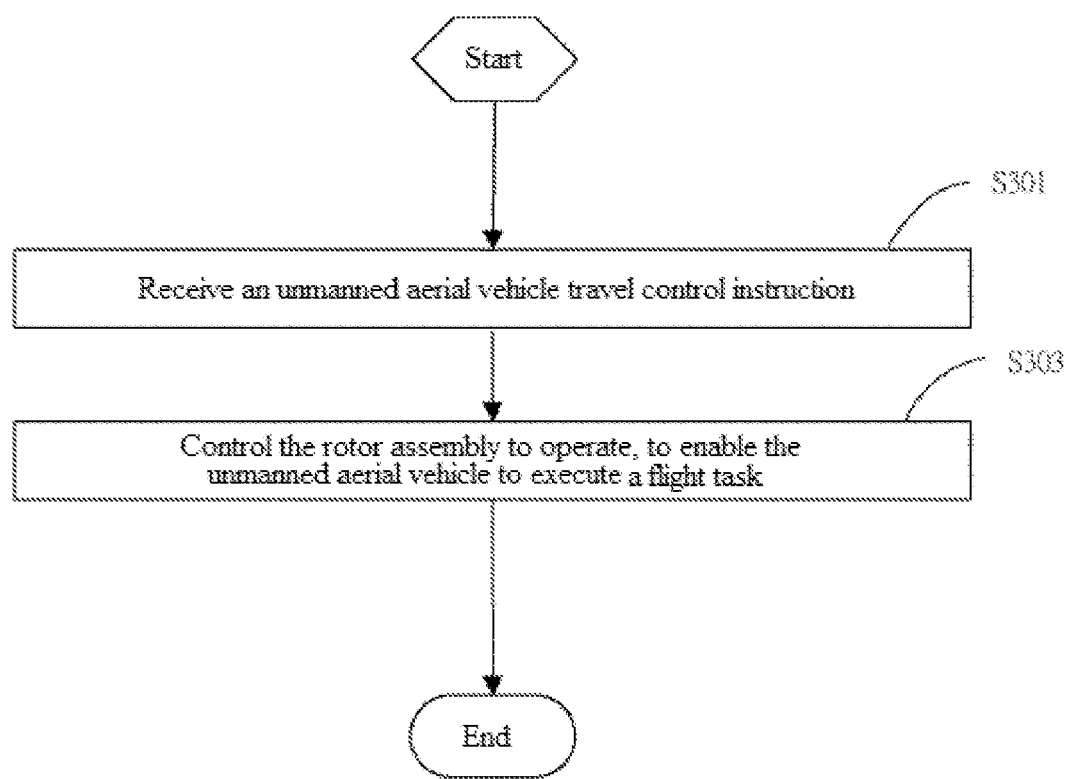
FIG. 16 is a schematic flow chart of an unmanned aerial vehicle travel control method according to an implementation mode of the present disclosure.

Referring to FIG. 15 to FIG. 16 at the same time, an unmanned aerial vehicle control method is further provided in the present disclosure. the unmanned aerial vehicle control method includes an unmanned aerial vehicle takeoff control method, an unmanned aerial vehicle travel control method, and the unmanned aerial vehicle landing control method described above, which are specifically as follows:

In the unmanned aerial vehicle takeoff control method:

Step S201: receive an unmanned aerial vehicle takeoff control instruction. Specifically, the unmanned aerial vehicle further includes a self-checking device. The unmanned aerial vehicle control system further includes a self-checking module which operates in the self-checking device. The central control module 101 receives the takeoff control instruction and transmits the takeoff control instruction into the self-checking module.

Step S203: check an operating state of the unmanned aerial vehicle. Specifically, the self-checking module controls the self-checking device to check the operating state of the unmanned aerial vehicle to determine that the unmanned aerial vehicle is already in a state suitable for flying. For example, the self-checking module controls the self-checking device to check whether the battery power of the unmanned aerial vehicle is sufficient, whether connections between respective electrical elements are good, and so on. It may eliminate safety hazards for the flight of the unmanned aerial vehicle. If the operating state of the unmanned aerial vehicle is determined as suitable for flying, the takeoff control instruction is transmitted into the takeoff control module 103. And, step S205 is performed. If it is determined that the operating state of the unmanned aerial vehicle is not suitable for flying, the process ends.

Step S205: control the power device 30 to operate to reduce and lift flight altitude of the unmanned aerial vehicle. Specifically, after receiving the takeoff control instruction from the self-checking module, the takeoff control module 103 controls the rotor assembly 32 of the power device 30 to operate at a predetermined speed/acceleration. It may drive the entire unmanned aerial vehicle to lift the flight altitude.

In the unmanned aerial vehicle travel control method:

Step S301: receive an unmanned aerial vehicle travel control instruction. Specifically, after the unmanned aerial vehicle takes off and reaches a predetermined altitude, the central control module 101 receives the travel control instruction and transmits the travel control instruction into the travel control module 105. The travel control instruction may include, but is not limited to, lifting the altitude, reducing the altitude, flying forward, flying back, turning, pitching, rolling, accelerating, decelerating, and so on.

Step S302: control the power device 30 to operate, to drive the unmanned aerial vehicle to execute a flight task. Specifically, the travel control module 105 controls the rotor assembly 32 of the power device 30 to rotate at a predetermined speed/acceleration to drive the entire unmanned aerial vehicle to execute a corresponding flight task.

In the unmanned aerial vehicle landing control method, the unmanned aerial vehicle landing control method is substantially the same as the unmanned aerial vehicle landing control method described above, which is not repeated in the specification in order to save space.

In the present disclosure, the unmanned aerial vehicle, the unmanned aerial vehicle control system, the unmanned aerial vehicle landing control method, and the unmanned aerial vehicle control method detect an object type of a landing destination of the unmanned aerial vehicle through a landing surface detection assembly. And, according to the object type, the present disclosure controls the takeoff and landing device to switch to an operating state adapted to the object type. If the landing surface detection assembly detects that the landing destination is a liquid surface such as a water surface, it is feasible to enable the unmanned aerial vehicle to smoothly land on the liquid surface and to navigate in the liquid by controlling the suspension device of the takeoff and landing device to enter into a state of being ready for inflation and expansion or controlling the takeoff and landing device to enter into a buoyancy support state. Therefore, the unmanned aerial vehicle can fly in the air and can also navigate on water.

It can be understood that when the unmanned aerial vehicle 100, 200 or 400 operates on water, it is feasible that either of the rotor assembly 32 and the propulsion assembly 34 provides travel power individually. It is also feasible that the rotor assembly 32 and the propulsion assembly 34 provide travel power together.

It can be understood that the number of the rotor assembly 32 may be different from that of the vehicle arm 14. For example, the number of the rotor assembly 32 may be less than that of the vehicle arm 14. It is also possible that the number of the rotor assembly may be more than that of the vehicle arm 14. It can be understood that the number of the vehicle arm 14 may be two, three, four, five, six, seven, eight, and so on. It can also be understood that the setting manners of the plurality of rotor assemblies 32 and the plurality of vehicle arms 14 may not be limited to the manner of one-to-one corresponding setting described above. For example, one or more of the plurality of vehicle arms 14 is/are provided thereon with the rotor assembly 32. For another example, one or more of the plurality of vehicle arms 14 is/are not provided thereon with the rotor assembly 32. For another example, one or more rotor assemblies 32 may be disposed on the same vehicle arm 14.

In some implementation modes, the connecting mechanism 341 may be a cylinder structure. Specifically, the connecting mechanism 341 is a linear reciprocating cylinder, which includes a cylinder body and a drive rod disposed on the cylinder body. The cylinder body is disposed on the vehicle body 12 while the drive rod is used for connecting the thruster 343. The cylinder body can drive the drive rod to drive the thruster 343 to move. It may cause the thruster 343 to relatively keep away from or get close to the vehicle body 12.

In other embodiments, the connecting mechanism 341 may also be a voice coil motor. The thruster 343 is disposed on a driving end of the voice coil motor and is capable of relatively keeping away from or getting close to the vehicle body 12 under the driving of the voice coil motor. It can be understood that the connecting mechanism 341 may also be a linear motor. The thruster 343 is disposed on a rotator of the linear motor, and is capable of relatively keeping away from or getting close to the vehicle body 12 under the driving of the linear motor.

In another embodiment, the connecting mechanism 341 may also be an electromagnetic mechanism. Specifically, the electromagnetic mechanism includes an electromagnet, a permanent magnet, and a guide rail. The guide rail is fixed onto the vehicle body 12. The thruster 343 is slidably disposed on the guide rail. One of the electromagnet and the permanent magnet is mounted onto the vehicle body 12 while the other one is mounted onto the thruster 343. By controlling a direction of a current on the electromagnet, the permanent magnet can be attracted or repelled to cause the thruster 343 to move along the guide rail to relatively keep away from or get close to the vehicle body 12.

In another embodiment, the connecting mechanism 341 may also be a lead screw nut mechanism. Specifically, the connecting mechanism 341 may include an electric motor, a lead screw, and a nut. The electric motor is fixedly mounted onto the vehicle body 12. The nut is sleeved on the lead screw and is fixedly connected with the thruster 343. When the electric motor drives the lead screw to rotate, the lead screw drives the thruster 343 to relatively keep away from or get close to the vehicle body 12 through the nut.

In another embodiment, the connecting mechanism 341 may also be a gear rack mechanism. Specifically, the gear rack mechanism may include an electric motor, a gear, and a rack. The electric motor is mounted onto the vehicle body 12. The gear is mounted to a driving end of the electric motor. And, the rack meshes with the gear. The thruster 343 is mounted onto the rack. When the electric motor drives the gear to rotate, the gear drives the thruster 343 to relatively keep away from or get close to the vehicle body 12 through the rack.

It can be understood that, in other implementation modes, the connecting mechanism 341 may also be other mechanical mechanisms such as a linkage, other than the above connecting mechanisms, as long as the mechanism enables the connecting mechanism 341 to drive the thruster 343 to relatively keep away from or get close to the vehicle body 12. It can be understood that the connecting mechanism 341 may also be designed as a connecting structure other than the above telescopic structure. For example, the connecting mechanism 341 may be a non-telescopic structure, as long as the thruster 343 is disposed on the vehicle body 12 through the connecting mechanism 341. It may be capable of providing travel power for navigation of the unmanned aerial vehicle 100 on the water surface.

It can be understood that, when the unmanned aerial vehicle 100, 200 or 400 is in an on-water operating state or a non-operating stationary state, the connecting mechanism 341 may be in an unfolded state, and may also be in a folded state. Without affecting the operating condition of the entire unmanned aerial vehicle, the unfolded or folded state of the connecting mechanism 341 may be adjusted as required.

It can be understood that, when the unmanned aerial vehicle 100, 200 or 400 is to land onto the water, the controller 70 can control the connecting mechanism 341 to be unfolded before the unmanned aerial vehicle 100, 200 or 400 lands. It can also control the connecting mechanism 341 to be unfolded after the unmanned aerial vehicle 100, 200 or 400 lands.

It can be understood that the structure of the supporting mechanism 521 may be the same as that of the connecting mechanism 341. In other words, the supporting mechanism 521 may be any one of the cylinder mechanism, the voice coil motor, the electromagnetic mechanism, the lead screw nut mechanism, and the gear rack mechanism as described above. It may also be other mechanical mechanisms such as a linkage, as long as the mechanism enables the supporting mechanism 521 to drive the buffer mechanism 523 to relatively keep away form or get close to the vehicle body 12. It can be understood that the supporting mechanism 521 may also be designed as a supporting structure other than the above telescopic structure. For example, the supporting mechanism 521 may be a non-telescopic structure while the buffer mechanism 523 is disposed on the vehicle body 12 through the supporting mechanism 521.

It can be understood that, when the unmanned aerial vehicle 100, 200 or 400 is in an aerial operating state or a non-operating stationary state, the supporting mechanism 521 may be in an unfolded state, and may also be in a folded state. Without affecting the operating condition of the entire unmanned aerial vehicle, the unfolded or folded state of the supporting mechanism 521 may be adjusted as required.

It can be understood that the distance sensor 745 may not be limited to the sensor forms such as the barometer, the ultrasonic range-finding sensor, and the laser range-finding sensor described above. It may also be other distance measuring devices. For example, the distance sensor 745 may be a visual sensor which can obtain flight altitude of the unmanned aerial vehicle. It may obtain a distance between the unmanned aerial vehicle and the landing destination, by acquiring a surface image of the landing destination and analyzing the surface image.

In the implementation modes of the present disclosure, the unmanned aerial vehicle is a rotor aircraft, which is used for carrying a shooting device such as a camera or a video camera for aerial photography. It can be understood that the unmanned aerial vehicle may also be used for mapping, disaster investigation and rescue, aerial monitoring, transmission line inspection, and other work. It can also be understood that the unmanned aerial vehicle may also be a fixed wing aircraft.

It can be understood that the unmanned aerial vehicle of the present disclosure may land on water surfaces such as lake, river and sea. It may also land on other suitable liquid surfaces. For example, when the unmanned aerial vehicle is used for monitoring an experiment of solution reaction, the unmanned aerial vehicle can land and/or navigate on a surface of the solution. The unmanned aerial vehicle can also land and/or navigate on an oil surface to execute work such as oil quality monitoring and oil sample collection.

The above implementation modes are merely used to describe instead of limiting the technical solutions of the present disclosure. Although the present disclosure is described in detail with reference to the above implementation modes, persons of ordinary skill in the art should understand that all the modifications or equivalent replacements made to the technical solutions of the present disclosure should not depart from the spirit and scope of the technical solutions of the present disclosure.

The invention claimed is:

1. An unmanned aerial vehicle comprising:
   a fuselage;
   a power device connected to the fuselage, the power device including a rotor assembly rotatably coupled to the fuselage, the rotor assembly including a propeller, and the rotor assembly being rotatable with respect to the fuselage about an axis perpendicular to a rotary shaft of the propeller; and
   a control device disposed at the fuselage and electrically connected with the power device, the control device being configured to control the power device to switch an operating mode of the power device to cause the unmanned aerial vehicle to fly in air or navigate on a water surface.

2. The unmanned aerial vehicle according to claim 1, further comprising:
   a takeoff and landing device electrically connected with the control device,
   wherein the control device is further configured to control the takeoff and landing device to switch an operating mode of the takeoff and landing device to cause the unmanned aerial vehicle to land on a land or on the water surface.

3. The unmanned aerial vehicle according to claim 2, wherein the control device comprises a main controller configured to control the power device and the takeoff and landing device to switch to a land landing mode upon receipt of a land landing control instruction.

4. The unmanned aerial vehicle according to claim 2, wherein the control device comprises a main controller configured to:

control the takeoff and landing device to switch to an on-water landing mode with a buoyancy support upon receipt of an on-water landing control instruction, and
control the power device to drive the unmanned aerial vehicle to land on the water surface.

5. The unmanned aerial vehicle according to claim 4, wherein:
   the control device comprises a distance sensor configured to detect a distance between the unmanned aerial vehicle and the water surface, and
   the main controller is further configured to control the takeoff and landing device to enter into a ready-to-land state according to the distance.

6. The unmanned aerial vehicle according to claim 5, wherein the main controller is further configured to control the takeoff and landing device to enter into the ready-to-land state in response to the distance sensor determining that the distance between the unmanned aerial vehicle and the water surface is within a pre-set range.

7. The unmanned aerial vehicle according to claim 4, wherein:
   the control device further comprises a depth detector configured to detect a water depth below the water surface, and
   the main controller is further configured to control the power device not to drive the unmanned aerial vehicle to land in response to the depth detector determining that the depth falls within a pre-set depth range.

8. The unmanned aerial vehicle according to claim 7, wherein the unmanned aerial vehicle further comprises an alarm configured to send a warning signal to a user of the unmanned aerial vehicle to indicate that a landing destination is not suitable for landing in response to the depth detector determining that the depth falls within the pre-set depth range.

9. The unmanned aerial vehicle according to claim 4, wherein:
   the fuselage comprises a vehicle body,
   the takeoff and landing device and the power device are disposed at the vehicle body, and
   the takeoff and landing device comprises a suspension device configured to provide buoyance support when the unmanned aerial vehicle navigates on the water surface.

10. The unmanned aerial vehicle according to claim 9, wherein:
    the suspension device comprises a bottom plate and a side plate disposed on a peripheral edge of the bottom plate, and
    an angle between the bottom plate and the side plate equals a predetermined angle.

11. The unmanned aerial vehicle according to claim 10, wherein:
    the side plate is adjustably mounted on the bottom plate, and
    the angle between the bottom plate and the side plate is adjustable.

12. The unmanned aerial vehicle according to claim 10, wherein:
    the bottom plate is adjustably connected to the vehicle body, and
    an angle between the bottom plate and the vehicle body is adjustable.

13. The unmanned aerial vehicle according to claim 9, wherein:

the takeoff and landing device further comprises a landing gear disposed on the vehicle body, and the suspension device is disposed on the landing gear.

14. The unmanned aerial vehicle according to claim 13, wherein the landing gear comprises:
a supporting mechanism disposed on the vehicle body; and
a buffer mechanism disposed on the supporting mechanism.

15. The unmanned aerial vehicle according to claim 14, wherein the supporting mechanism is a telescopic supporting mechanism and is configured to drive the buffer mechanism to move away from or towards the vehicle body.

16. The unmanned aerial vehicle according to claim 9, wherein:
the control device is further configured to:
control the rotor assembly to operate to provide power for the unmanned aerial vehicle to fly in the air, or
control the one or more rotor assemblies to rotate a predetermined angle relative to the vehicle body about the axis perpendicular to the rotary shaft of the propeller and to operate to provide power for the unmanned aerial vehicle to navigate on the water surface.

17. The unmanned aerial vehicle according to claim 16, wherein:
the fuselage further comprises a vehicle arm disposed on the vehicle body, and
the rotor assembly is rotatably mounted on the vehicle arm.

18. The unmanned aerial vehicle according to claim 17, wherein:
the rotor assembly comprises a mounting member rotatably disposed on the vehicle arm, and
the control device is configured to control the mounting member to rotate relative to the vehicle arm.

19. The unmanned aerial vehicle according to claim 18, wherein the rotor assembly further comprises a driving member, the driving member being disposed on the mounting member and the propeller being disposed on the driving member.

20. The unmanned aerial vehicle according to claim 1, wherein the control device further comprises a positioner configured to track a geographic location of the unmanned aerial vehicle in real time.

* * * * *